(12) United States Patent
Mehta et al.

(10) Patent No.: US 10,075,462 B2
(45) Date of Patent: Sep. 11, 2018

(54) SYSTEM AND USER CONTEXT IN ENTERPRISE THREAT DETECTION

(71) Applicant: SAP SE, Walldorf (DE)

(72) Inventors: Harish Mehta, Walldorf (DE); Hartwig Seifert, Elchesheim-Illingen (DE); Thomas Kunz, Lobbach-Lobenfeld (DE); Anne Jacobi, Wieslock (DE); Marco Rodeck, Maikammer (DE); Florian Kraemer, Dielheim (DE); Björn Brencher, Walldorf (DE); Nan Zhang, Schriesheim (DE)

(73) Assignee: SAP SE, Walldorf (DE)

( * ) Notice: Subject to any disclaimer, the term of this patent is extended or adjusted under 35 U.S.C. 154(b) by 164 days.

(21) Appl. No.: 14/978,984

(22) Filed: Dec. 22, 2015

(65) Prior Publication Data

US 2017/0180403 A1 Jun. 22, 2017

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC .................. H04L 63/1425; H04L 63/1416
See application file for complete search history.

(56) References Cited

U.S. PATENT DOCUMENTS

| | | | |
|---|---|---|---|
| 7,380,205 B2 | 5/2008 | Bezrukov et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |
| 7,624,092 B2 | 11/2009 | Lieske et al. | |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 7,971,209 B2 | 6/2011 | Eberlein et al. | |
| 8,051,034 B2 | 11/2011 | Mehta et al. | |
| 8,234,312 B2 | 7/2012 | Thomas | |
| 8,307,012 B2 | 11/2012 | Thomas | |
| 8,418,246 B2 * | 4/2013 | McConnell | G06F 21/55 726/22 |
| 8,661,103 B2 | 2/2014 | Mehta et al. | |
| 8,775,671 B2 | 7/2014 | Rodeck et al. | |
| 8,892,454 B2 | 11/2014 | Rabetge et al. | |
| 8,924,415 B2 | 12/2014 | Thomas | |
| 8,954,602 B2 | 2/2015 | Seifert et al. | |
| 8,984,633 B2 * | 3/2015 | Reutter | G06F 21/552 709/206 |
| 9,037,678 B2 | 5/2015 | Mehta et al. | |

(Continued)

*Primary Examiner* — Yonas Bayou
(74) *Attorney, Agent, or Firm* — Fish & Richardson P.C.

(57) ABSTRACT

A transfer of master data is executed in a backend computing system. The master data includes user data and system data. The transfer of master data includes receiving user data associated with a particular user identifier in the backend computing system, transferring the received user data to an event stream processor, receiving system data associated with a particular log providing computing system in the backend computing system, transferring the received user data to the event stream processor, and executing a transfer of log data associated with logs of computing systems connected to the backend computing system.

20 Claims, 31 Drawing Sheets

(56) References Cited

U.S. PATENT DOCUMENTS

| | | | |
|---|---|---|---|
| 9,148,488 B2 | 9/2015 | Rabetge et al. | |
| 9,286,354 B2* | 3/2016 | Cammert | G06F 17/30516 |
| 9,317,343 B1* | 4/2016 | Willhoit | G06F 11/34 |
| 9,639,662 B2* | 5/2017 | Sethumadhavan | G06Q 50/24 |
| 2008/0288513 A1 | 11/2008 | Bezrukov et al. | |
| 2009/0287628 A1* | 11/2009 | Indeck | G06N 5/025 |
| | | | 706/47 |
| 2012/0047257 A1* | 2/2012 | Hauser | G06F 21/316 |
| | | | 709/224 |
| 2013/0159832 A1* | 6/2013 | Ingargiola | G06F 17/246 |
| | | | 715/220 |
| 2013/0238349 A1* | 9/2013 | Sethumadhavan | G06Q 50/24 |
| | | | 705/2 |
| 2013/0304665 A1 | 11/2013 | Rodeck et al. | |
| 2013/0304666 A1 | 11/2013 | Rodeck et al. | |
| 2013/0326079 A1 | 12/2013 | Seifert et al. | |
| 2013/0326087 A1 | 12/2013 | Storz et al. | |
| 2014/0040434 A1* | 2/2014 | Rybak | G07C 5/008 |
| | | | 709/219 |
| 2014/0114742 A1* | 4/2014 | Lamontagne | G06Q 30/0242 |
| | | | 705/14.41 |
| 2014/0358926 A1* | 12/2014 | McGregor | G16H 10/60 |
| | | | 707/737 |
| 2015/0237057 A1* | 8/2015 | Claes | H04L 63/105 |
| | | | 726/27 |

* cited by examiner

FIG. 4

SYSTEM AND USER CONTEXT IN ENTERPRISE THREAT DETECTION

CROSS-REFERENCE TO RELATED APPLICATIONS

This application is a co-pending application of U.S. application Ser. No. 14/978,963, filed on Dec. 22, 2015 entitled "KNOWLEDGE BASE IN ENTERPRISE THREAT DETECTION"; and U.S. application Ser. No. 14/978,995, filed on Dec. 22, 2015 entitled "LOG NORMALIZATION IN ENTERPRISE THREAT DETECTION"; and U.S. application Ser. No. 14/979,015, filed on Dec. 22, 2015 entitled "EFFICIENT IDENTIFICATION OF LOG EVENTS IN ENTERPRISE THREAT DETECTION"; the entire contents of each and as a whole, are incorporated herein by reference.

BACKGROUND

A computing system may maintain a data log which documents events and other activities occurring within the computing system. The data log can be stored, for example, in a file, database, or some other repository. Each entry in the data log can include a description of an event being logged, and a timestamp indicating the occurrence of the event. The entries in the data log can correspond to transactions occurring within the computing system, error conditions, or other types of events. Identification of events in data logs is often inefficiently performed.

SUMMARY

The present disclosure relates to enriching log data with system and user context in enterprise threat detection.

A transfer of master data is executed in a backend computing system. The master data includes user data and system data. The transfer of master data includes receiving user data associated with a particular user identifier in the backend computing system, transferring the received user data to an event stream processor (ESP), receiving system data associated with a particular log providing computing system in the backend computing system, transferring the received user data to the event stream processor, and executing a transfer of log data associated with logs of computing systems connected to the backend computing system.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

For example, one computer-implemented method includes: executing a transfer of master data is executed in a backend computing system, receiving user data associated with a particular user identifier in the backend computing system, transferring the received user data to an event stream processor, receiving system data associated with a particular log providing computing system in the backend computing system, transferring the received user data to the event stream processor, and executing a transfer of log data associated with logs of computing systems connected to the backend computing system.

The foregoing and other implementations can each optionally include one or more of the following features, alone or in combination:

A first aspect, combinable with the general implementation, wherein, for user data, the master data is received from a user management system or an identity management system, and wherein, for system data, the master data is received from system context data associated with a particular computing system connected to the backend computing system as determined by a software application executing on the backend computing system or manual maintenance data related to a particular system context.

A second aspect, combinable with the general implementation, wherein the user data is associated with a single individual or a common identification associated with multiple individuals.

A third aspect, combinable with the general implementation, comprising, if determined that a user context associated with the particular user is not available to the ESP, creating a new user context associated with the particular user; and if determined that a user context associated with the particular user is available to the ESP, updating the user context associated with the particular user.

A fourth aspect, combinable with the general implementation, comprising, if determined that a system context associated with the particular log providing computing system is not available to the ESP, creating a new system context associated with the particular log providing computing system; and if determined that a system context associated with the particular log providing computing system is available to the ESP, updating the system context associated with the particular log providing computing system.

A fifth aspect, combinable with the general implementation, wherein the transfer of log data comprises: reading log data from a particular log associated with a particular computing system, wherein the log data is read starting with the latest timestamp; transferring read log data to the ESP, wherein the read log data is transformed into a normalized format prior to transfer; and enriching each log entry of the transferred log data.

A sixth aspect, combinable with the general implementation, wherein the enrichment of each particular log entry comprises: attempting to read a user context for a particular user id associated with the particular log entry; if a user context for the particular user id is found within the backend computing system, writing into the particular log a user context id associated with the user context; if a user context for the particular user id is not found within the backend computing system, creating a new user context within the backend computing system and writing into the particular log a user context id associated with the new user context; removing the original user id from the particular log entry; and writing a revised log entry into the backend computing system.

The subject matter described in this specification can be implemented in particular implementations so as to realize one or more of the following advantages.

User and System Context

Multiple sets of log data from different logs from different systems can be correlated and the correlated log data can be used in threat detection. Log data can be correlated for a particular user when the log data for the user is associated with different systems. System role, availability, status, and other system context information can be used to evaluate a potential threat associated with a particular system.

Log Interpretation and Normalization

Previously unknown log entry types can be learned by a threat detection system and used for threat detection. Learned log entry types can be mapped to a semantic meaning model. Incoming log data can be recognized as being associated with a learned log entry type and classified according to the semantic meaning model.

Log Event Knowledge Base

A knowledge base can model semantic commonality between log entries that have different physical structures. The knowledge base can provide semantic structure and vocabulary that can be used in user interfaces of a threat detection system. The knowledge base can allow for semantic searching and filtering of log data by semantic events, roles, and attributes. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 illustrates an example user interface for creating a log learning run, according to an implementation.

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Figure 1:
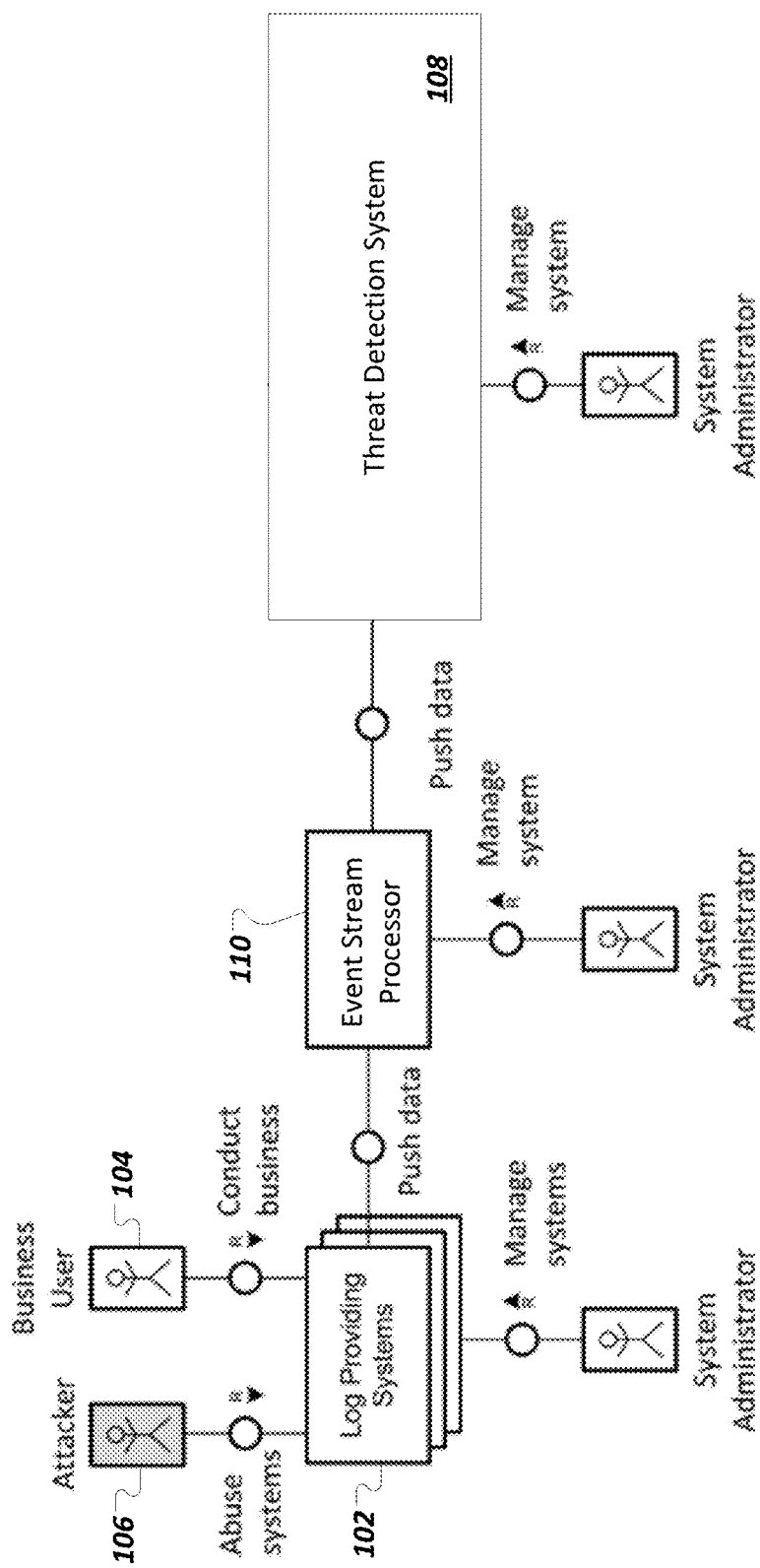
FIG. 1 is a high-level architectural block diagram illustrating an example distributed computing system (EDCS) for log event analysis, according to an implementation.

FIG. 1 is a high-level architectural block diagram illustrating an example distributed computing system (EDCS) 100 for log event analysis in enterprise threat detection, according to an implementation. Log providing systems 102 can generate various types of log data, such as from automated processes and through the use of such systems by business users 104 and other users. The log providing systems 102 can include heterogeneous landscapes, business systems, interconnected systems, mobile and cloud-based systems, applications, network components (e.g., proxies, routers, switches), or any other system that generates log data. Log data can include, for example, data from user change logs, business transaction logs, change document logs, gateway logs, HTTP (HyperText Transfer Protocol) server logs, read access logs, system logs, security audit logs, etc.

Log data generated by log providing systems 102 can provide a wealth of information regarding activities that occur within an application, a database, an operating system, or a network component, for example. Log data can also include evidence of malicious activity performed, for example, by an attacker user 106 or an attacking computing system (e.g., a log providing system 102 used by the attacker user 106). A threat detection system 108 can evaluate log data generated by the log providing systems 102 to identify potential security threats.

The log providing systems 102 can provide log data to an event stream processor 110. The event stream processor 110 can, for example, provide one or more services to the log providing systems 102 for providing log data to the event stream processor 110. As illustrated, log data is pushed from the log providing system 102 to the event stream processor 110 using a "push" service provided by the event stream processor 110. In other implementations, log data can be pulled or pushed/pulled to/from the log providing system 102 using a pull or push/pull service provided by the event stream processor 110. In other implementations, the event stream processor 110 can register with each individual log providing system 102 which provides a push and/or pull service to allow the event stream processor 110 to access log data. In other possible implementations, the push and/or pull services can be provided by one or both of the log providing system 102 and the event stream processor 110. As will be understood by those of ordinary skill in the art, other methods of transferring log data between the components of the EDCS 100 are possible. These other methods, where consistent with this disclosure, are considered to be within the scope of this disclosure.

Typically, the event stream processor 110 can normalize, filter, transform, and/or enrich log data, from multiple log providing systems 102, As described in more detail below, the event stream processor 110 can classify received log data, such as log data received from a log providing system 102 that does not initially have an identified structure. The event stream processor 110 can provide data, including classified log data, to the threat detection system 108. Note that data provided to the threat detection system 108 can, similar to data transfer between a log providing system 102 and the event stream processor 110, be configured to be accessible using a push and/or pull service provided by the event stream processor 110 and/or the threat detection system 108 or another method consistent with this disclosure. The threat detection system 108 can, for example, evaluate the classified log data to determine whether the classified log data matches one or more threat detection patterns that are defined, e.g., by a system administrator 114, using one or more rules. A runtime component of the threat detection system 108 can determine whether a received, classified log entry matches one or more rules. When a received, classified log entry matches a rule, an alert can be generated, for example.

Figure 2:
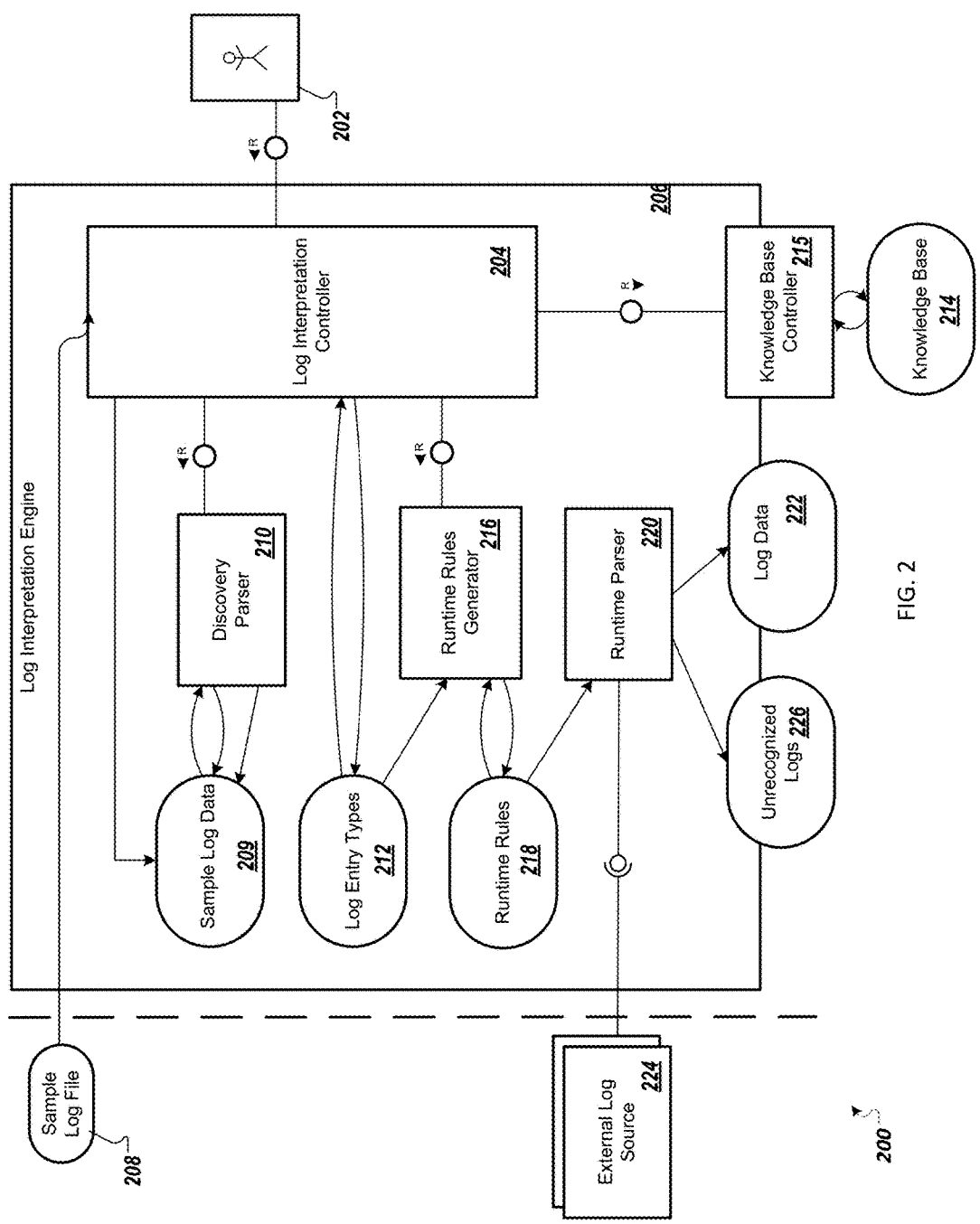
FIG. 2 illustrates an EDCS for log interpretation and runtime classification, according to an implementation.

FIG. 2 illustrates an EDCS 200 for log interpretation and runtime classification, according to an implementation. An administrator 202 can use a log interpretation controller user interface 204 associated with a log interpretation engine 206 to initiate a log learning run by uploading a sample log file 208. The log interpretation engine 206 can be associated with one or both of the event stream processor 110 or the threat detection system 108.

The sample log file 208 can be stored in the log interpretation engine 206 as sample log data 209. A discovery parser 210 can analyze the sample log data 209 to identify log entry types 212 that are included in the sample log data 209. The discovery parser 210 can generate a markup string for each log entry type. A markup string can describe the structure and components of a particular log entry type. The markup strings can be presented to the administrator 202 in the log interpretation controller user interface 204. The administrator 202 can use the log interpretation controller user interface 204 to assign a log type, a semantic event, semantic roles, and knowledge base attributes to relevant components of a log entry type that is associated with a presented markup string.

Semantic events, semantic roles, log types, and knowledge base attributes can be defined in a knowledge base 214. The administrator 202 and/or other administrators may have previously used a knowledge base controller user interface 215 to create initial entries in the knowledge base 214. The assignment of log types, semantic events, semantic roles, and attributes to particular log entry types can be stored in the knowledge base 214. The knowledge base 214 is described in more detail below.

A runtime rules generator 216 can generate runtime rules 218 to be used by a runtime parser 220. The runtime rules 218 can include characteristics of a log entry type identified by the discovery parser 210 that allow the unique identification of the log entry type by the runtime parser 220 in log data 222 received from an external log entry source 224. The runtime rules 218 can include, for example, regular expressions that can be used by the runtime parser 220 to extract components of an incoming log entry included in the log data 222. The runtime parser 220 can categorize and normalize and enrich the log entry by assigning a log entry type, a semantic event, semantic roles, and attributes according to the runtime rules 218 associated with the identified log entry type. The normalized and enriched log entry can be saved in the threat detection system 108 and used for forensic analysis.

In some implementations, the runtime parser 220 uses one or more of a key value brancher, a component brancher, and a fixed text brancher to identify a log entry type of an incoming log entry. The key value brancher can be used to attempt to identify the type of an incoming log entry by identifying one or more particular, previously-learned key-value pairs that may identify the log entry type (e.g., HOST=example.corp, IP=192.168.2.1; TIMESTAMP=20151204). The component brancher can identify components that are included in respective types of log entries. For example, the component brancher can identify that first, second, and third types of log entries have respective structures having respective patterns of "<Timestamp> fixed-word-1 fixed-word-2<IP>," "<Timestamp> fixed-word-2 fixed-word-3<Mac>," and "<Time> fixed-word-2<Integer> fixed-word-4," where fixed words are particular constant text values that appear in the respective log entries. For example, the fixed text brancher can determine that fixed word patterns of "fixed-word-1 fixed-word-2," "fixed-word-2 fixed-word 3," and "fixed-word 4" respectively correspond to the first, second, and third log entry types. The fixed text brancher can generate first, second, and third regular expressions that can be used to identify these fixed word patterns. The regular expressions can be used to identify a potential log entry type of an incoming log message, if other log entry type identification approaches (such as those used by the key value brancher or the component brancher) fail to identify the type of the incoming log entry. For example, suppose that an incoming log entry includes (e.g., begins with) the data "04.12.2015 10:00 fixed-word-1 fixed-word-2 192.168.1.0." The fixed text brancher can determine that the first regular expression matches the incoming log entry and that the incoming log entry may be of the first log entry type.

Log data that includes log entries that are not able to be identified by the runtime parser 220 can be stored as unrecognized logs 226. The administrator 202 can use the log interpretation controller user interface 204 to upload an unrecognized log 226 as a sample log file 208, to be interpreted and learned by the discovery parser 210, to identify previously unknown log entry types. The administrator 202 can use the log interpretation controller user interface 204 to assign semantic events, semantic roles, and attributes to a newly discovered log entry type, for storage in the knowledge base 214 and for generation of new runtime rules 218.

Figure 3A:
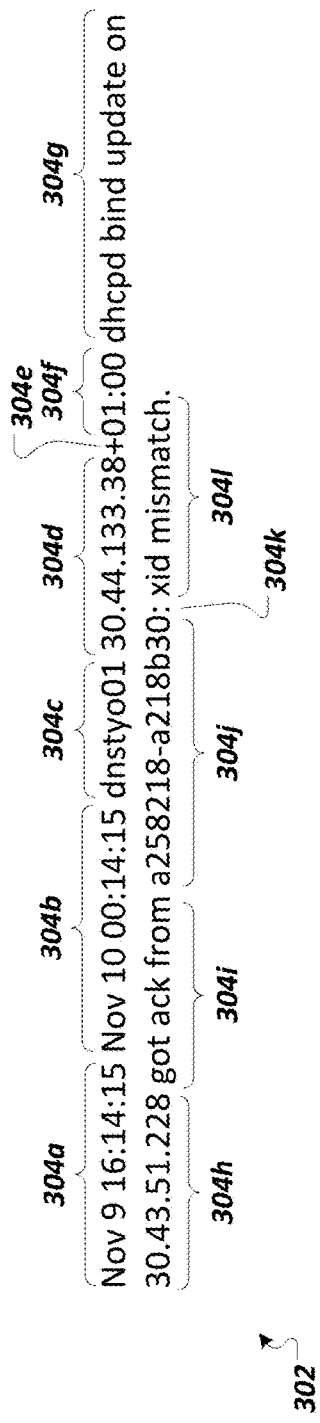
FIGS. 3A and 3B illustrate an example log entry and a corresponding log entry structure, respectively, according to an implementation.
Figure 3B:
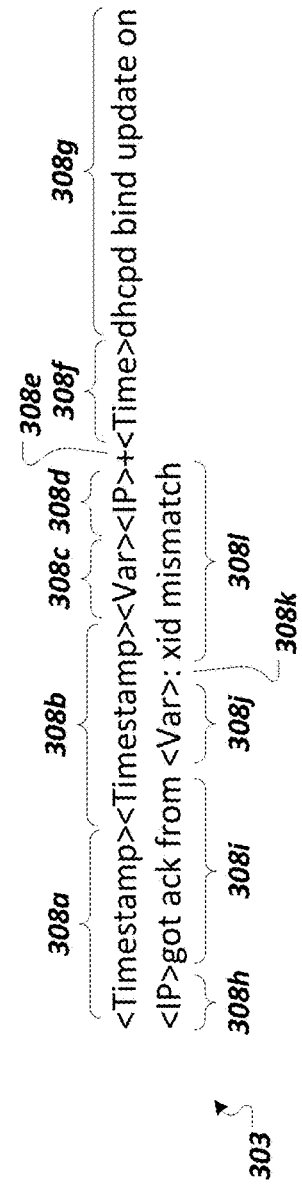

FIGS. 3A and 3B illustrate an example log entry 302 and a corresponding log entry structure 303, respectively, according to an implementation. The log entry structure 303 can be, for example, a markup string determined by the discovery parser 210. As will be understood by those of ordinary skill in the art, this example is only one of a myriad of possible log entries and log entry structures. The example log entry 302 is provided for clarity and understanding and is not meant to limit the disclosure in any way. The log entry 302 includes multiple components, with each component being either literal text, variable text, or an instance of a particular data type. For example, the log entry 302 includes a first timestamp 304a, a second timestamp 304b, first variable text 304c, a first IP address 304d, a literal "+" symbol 304e, a time value 304f, literal text 304g of "dhcpd bind update on," a second IP address 304h, literal text 304i of "got ack from," second variable text 304j, a literal ":" symbol 304k, and literal text 304l of "xid mismatch".

The log entry structure 303 represents the structure of the log entry 302 and can be used to define a class that represents all log entries that conform to a same structure. The log entry structure 303 includes sets of markup symbols (e.g., tags, "< >") which indicate data types and positions of components included in the log entry 302. The log entry structure 303 includes a tag for each typed or variable data instance included in the log entry 302. Literal text, literal symbols, and white space included in the log entry 302 is left unchanged in the log entry structure 303.

For example, a first timestamp tag 308a, a second timestamp tag 308b, a first variable tag 308c, a first IP tag 308d, a time tag 308f, a second IP tag 308h, and a second variable tag 308j correspond to the first timestamp 304a, the second timestamp 304b, the first variable text 304c, the first IP address 304d, the time value 304f, the second IP address 304h, and the second variable text 304j, respectively. Literal items 308e, 308g, 308k, and 308l respectively correspond to the literal symbol 304e, the literal text 308g, the literal symbol 304k, and the literal text 304l.

FIG. 4 illustrates an example user interface 400 for creating a log learning run, according to an implementation. A run list 402 displays information for previously-created log learning runs. A create run control 404 can be selected to create a new run. In response to selection of the create run control 404, a create dialog 406 can be displayed. The user can enter a run name using a run name entry field 408. A description can be entered using a description entry field 410. A file name of a file that includes training data can be entered or selected using file selection controls 412. Creation of the new run can be initiated in response to selection of a create control 414.

Figure 5:
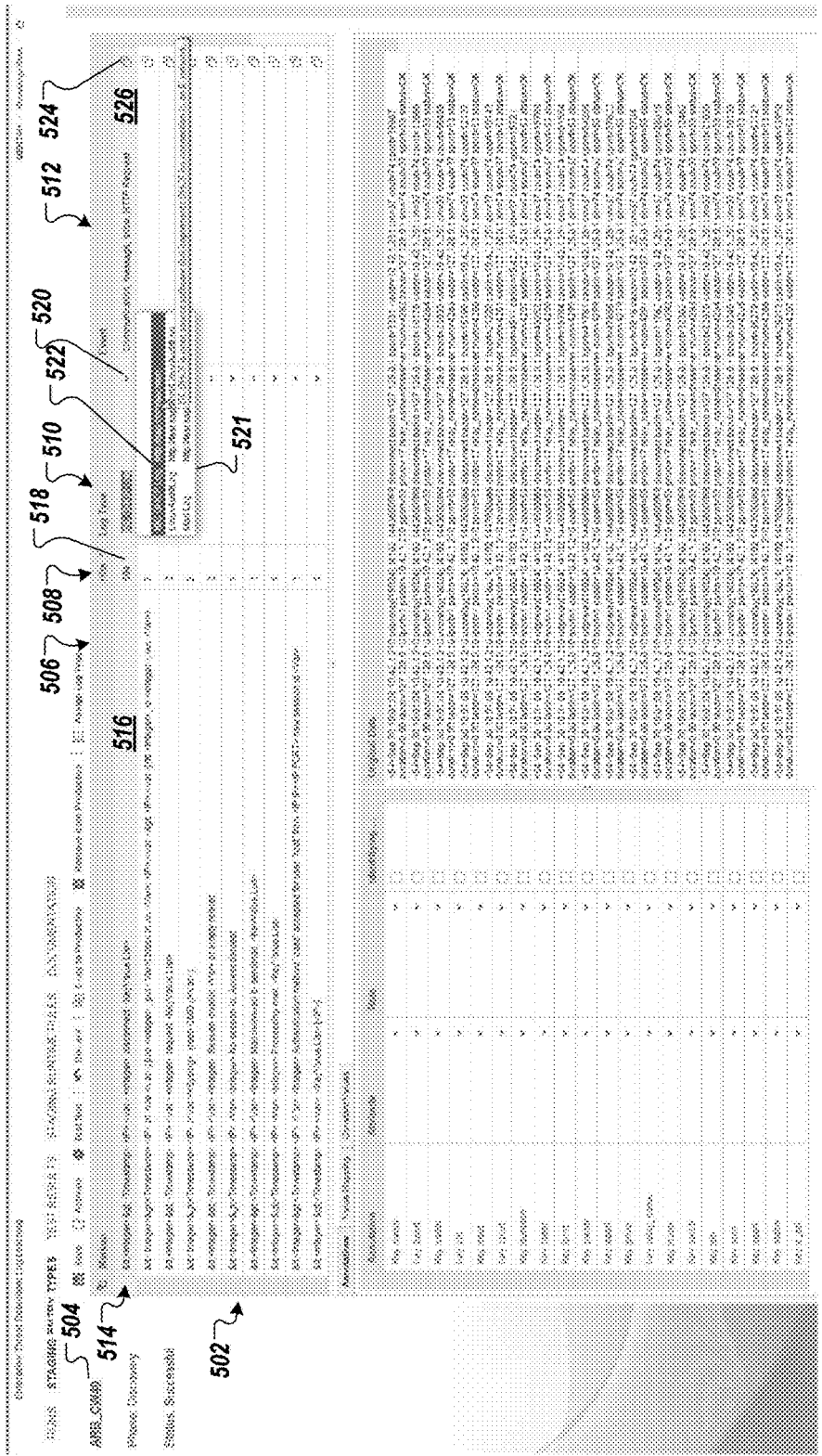
FIG. 5 illustrates an example log learning staging user interface, according to an implementation.

FIG. 5 illustrates an example log learning staging user interface 500, according to an implementation. The log learning stating user interface 500 enable a user to assign a log type, semantic event type, and attributes to identified log entry types. Semantic events are described in more detail below. A markup strings area 502 includes markup strings that represent log entry types that have been identified by the discovery parser 210 during a log learning run 504. The markup strings area 502 includes a markup column 506, a hits column 508, a log type column 510, and an event column 512. The markup column 506 includes a markup string in each row of the markup strings area 502 that represents a unique log entry type identified by the discovery parser 210. For example, a selected row 514 of the markup strings area 502 includes a markup string 516 of "<<Integer>><Timestamp><IP><Var><Integer> disconnect <KeyValue.List>". The markup string 516 includes tags as placeholders for components included in log entries that match the markup string 516. For example, the "<Integer>" tag included in the markup string 516 indicates that log entries that match the markup string 516 include an integer value between a less-than symbol (<) and a greater-than symbol (>).

The hits column 508 includes a number of log entry occurrences of respective identified log entry types that were identified during the log learning run. For example, a hits value 518 indicates that 554 occurrences of log entries that match the markup string 516 were identified during the log learning run. The log type column 510 can enable the user to select a log type to be associated with a markup string of a given row. For example, the user can select a selection control 520 to cause a log type list 521 to be displayed. The user can select a particular log type (e.g., a selected log type 522 of "ISC DHCP Log") to be associated with the markup string 516.

Similarly, the event column 512 can enable the user to select an event type to be associated with a markup string of a given row. For example, the user can select a selection control 524 to display an event type selection user interface (not shown), from which an event type can be selected. For example, a selected event type 526 of "Communication, message, allow, HTTP Request" is included in the selected row 514 and thereby associated with the markup string 516.

Figure 6:
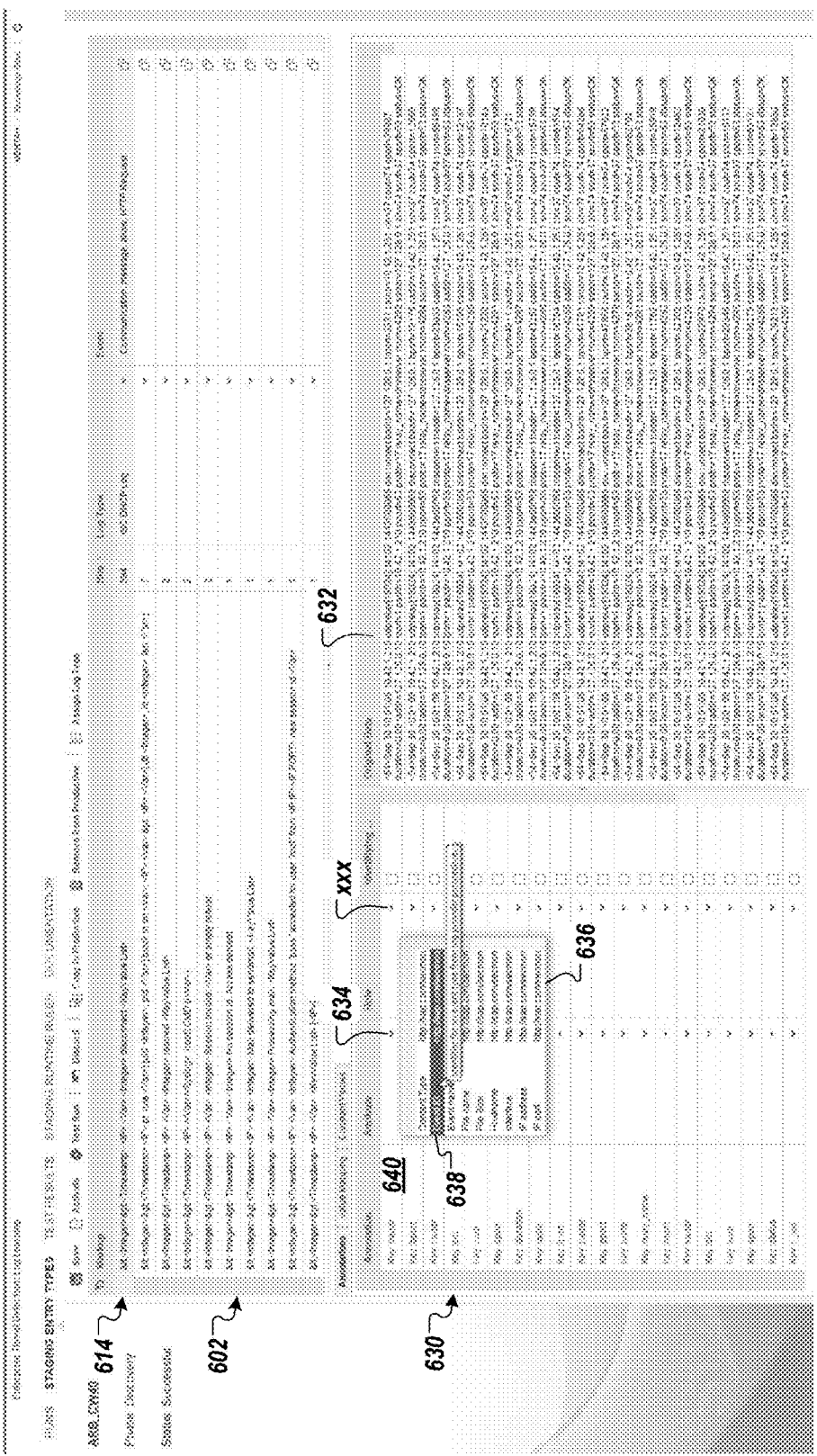
FIG. 6 illustrates another example log learning staging user interface, according to an implementation.

FIG. 6 illustrates another example log learning staging user interface 600, according to an implementation. An attributes area 630 can be used to assign attributes to annotations that have been identified in log entries during the log learning run. Original data analyzed during the log learning run can be shown in an original data area 632. The user can select an attribute selection control 634 to cause an attribute selection list 636 to be displayed from which an attribute (e.g., a selected attribute EVENTID 638) can be selected, to be associated with an annotation 640. A role selection control 642 can be selected to select and assign a role to the selected attribute 638.

Figure 7A:
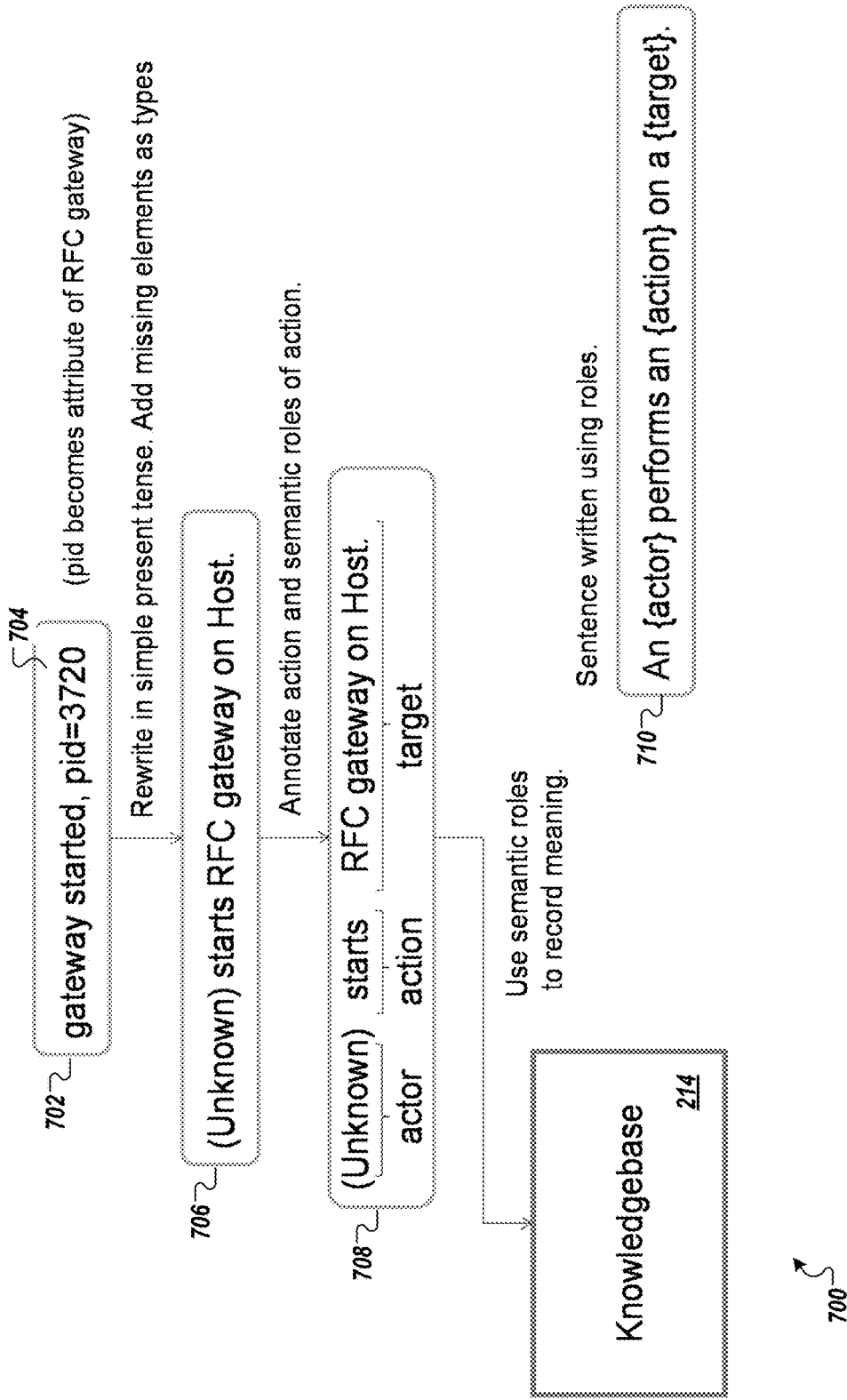
FIG. 7A is a diagram illustrating semantic events and semantic roles included in a knowledge base, according to an implementation.

FIG. 7A is a diagram 700 illustrating semantic events and semantic roles included in the knowledge base 214, according to an implementation. A log entry can report one or more events, such as a situation or a providing of statistical information. Events can include, for example, deny permission, change value of profile parameter, debug program, failed logon, etc. For some events, the event can be reflected in multiple log entries.

The knowledge base 214 can include a semantic model which can be used for assigning semantic events to log entry types. Different log entry types, in different formats, can be associated with a same semantic event type. For example, user logon events can be reflected in log entries of different log entry types. Each log entry of a log entry type that reflects a user logon event can be assigned a same "user log on" semantic event type, for example. The knowledge base 214 can be used to define semantic meaning of events that are reflected in log entries, represent common semantic information that is shared between log entries of different types, and provide structure and vocabulary for use in user interfaces used by users of the threat detection system 108, such as to search for and query information within and across log entry types.

Semantic meaning of events can be identified by determining actions, attributes and semantic roles that occur in different types of log entries. For example, for a partial log entry 702, a process identifier attribute 704 can be identified. As indicated by a sentence 706, the log entry 702 can be rewritten using a present tense form, with missing elements added as types. An annotated sentence 708 illustrates an action (e.g., "start") annotation and role annotations (e.g., "actor," "target") associated with the log entry 702. An actor role can be a role taken by an entity (e.g., person, program) that executes some action (e.g., making a change). A target role can be a role taken by an entity that is affected by an action (e.g., the entity that is changed). As described in more detail below, in the knowledge base 214, attributes associated with an entity that takes on a role can be associated with the role.

A generalized sentence 710 illustrates a more general form of the annotated sentence 708. Generalizations can be used to create relationships between events (e.g., "event A is a more general version of an event B," "the event B is a more specific version of the event A"). The annotated sentence 708 and the generalized sentence 710 can be used to model the semantic meaning of the log entry 702. A semantic meaning model corresponding to the log entry 702 can be generated and stored in the knowledge base 214, for use in identifying, classifying, and searching for log entries that match the semantic meaning of the log entry 702. In some implementations, the semantic meaning model is at least initially created by an administrator. In some implementations, at least portions of the semantic meaning model are generated at least in part by an automated process.

The semantic meaning model can be used to correlate log entries on a semantical basis. The knowledge base 214 enables correlated analysis of log data from different sources without requiring specific knowledge of particular log data providers and raw log data, since the knowledge base 214 includes abstractions of log data provider specific information. Semantic events can also be used for alert patterns. For example, an attack pattern can be defined using a semantic event, so that the attack pattern applies generally to too many different types of systems and is not specific to any particular system.

Figure 7B:
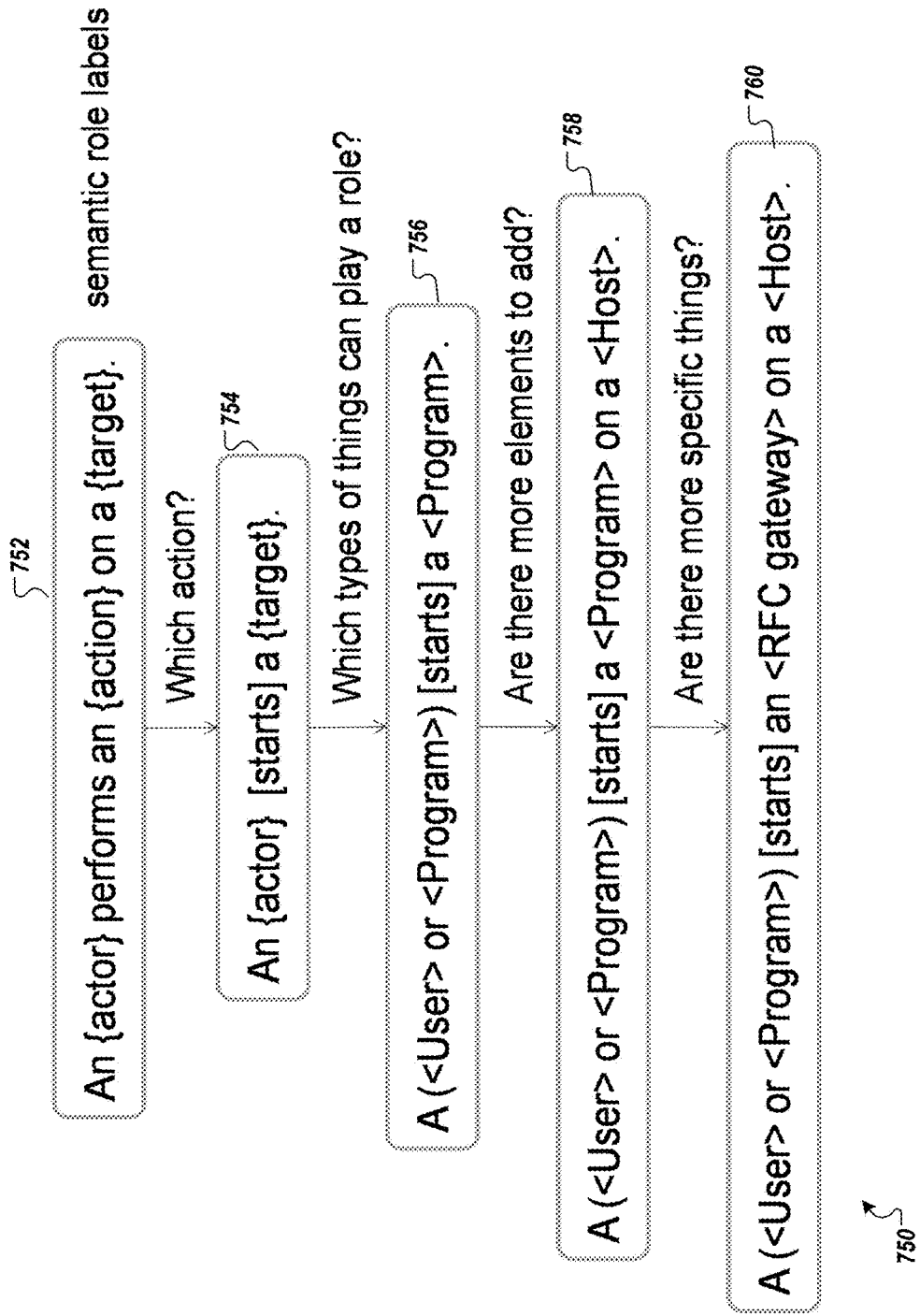
FIG. 7B is a diagram illustrating other aspects of semantic modeling, according to an implementation.

FIG. 7B is a diagram 750 illustrating other aspects of semantic modeling, according to an implementation. An annotated sentence 752 includes semantic role and action labels for a generic semantic event. An annotated sentence 754 describes a first level of specificity beyond the generic semantic event by the inclusion of a specific action label in place of a generic action label. An annotated sentence 756 describes a second level of specificity by the inclusion of specific "user" and "program" labels. A third level of specificity is described by an annotated sentence 758 that includes additional detail describing where the action occurs (e.g., "on a host"). A fourth level of specificity is described by an annotated sentence 760 that includes a specific example of a started program.

Figure 8:
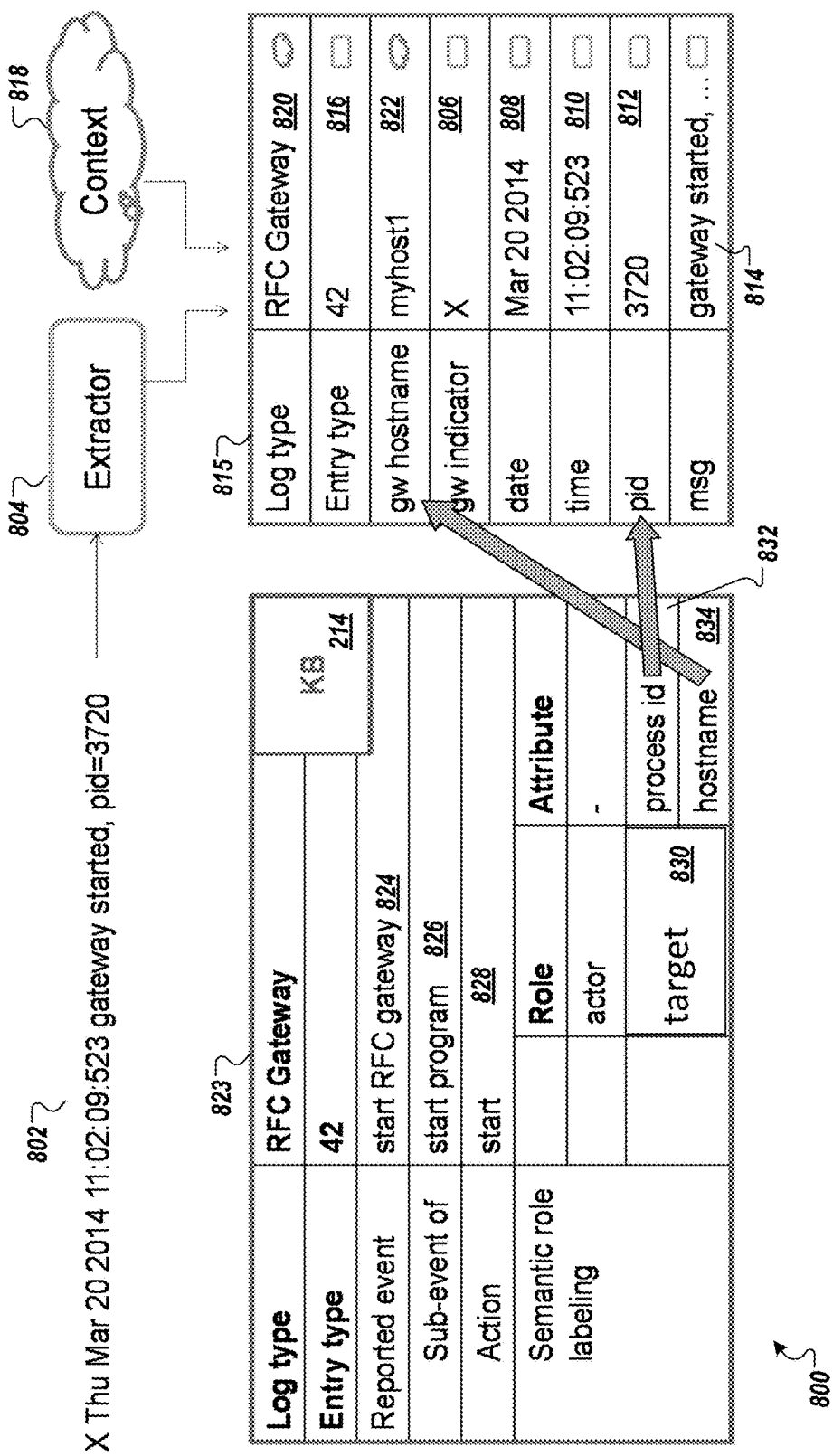
FIG. 8 is a diagram that illustrates a semantic modeling of an event corresponding to an example log entry, according to an implementation.

FIG. 8 is a diagram 800 that illustrates a semantic modeling of an event corresponding to an example log entry 802, according to an implementation. An extractor component 804 (e.g., the discovery parser 210) can identify component types included in the log entry 802 and extract component values 806, 808, 810, 812, and 814 for "gw indicator," date, time, "pid" (process identifier), and "msg" (message) components, respectively, to extracted/enriched values 815. A log entry type identifier of "42" 816 can be assigned to the log entry 802. Context information, including a log type of "RFC (Remote Function Call) Gateway" 820 and a "gw hostname" 822 of "myhost1," can be added to the extracted/enriched values 815.

Semantic meaning of the log entry 802 can be determined and stored in the knowledge base 214, e.g., as illustrated by semantic information 823. For example, a reported event type 824 of "start RFC Gateway," a parent event type 826 of "start program," and an action type 828 of "start" can be determined. A target role 830 associated with the event type 824 can be determined. Semantic attributes process id 832 and hostname 834 corresponding to the pid component 812 and the "gw hostname" 822 value, respectively, can be identified and associated with the target role 830.

Figure 9:
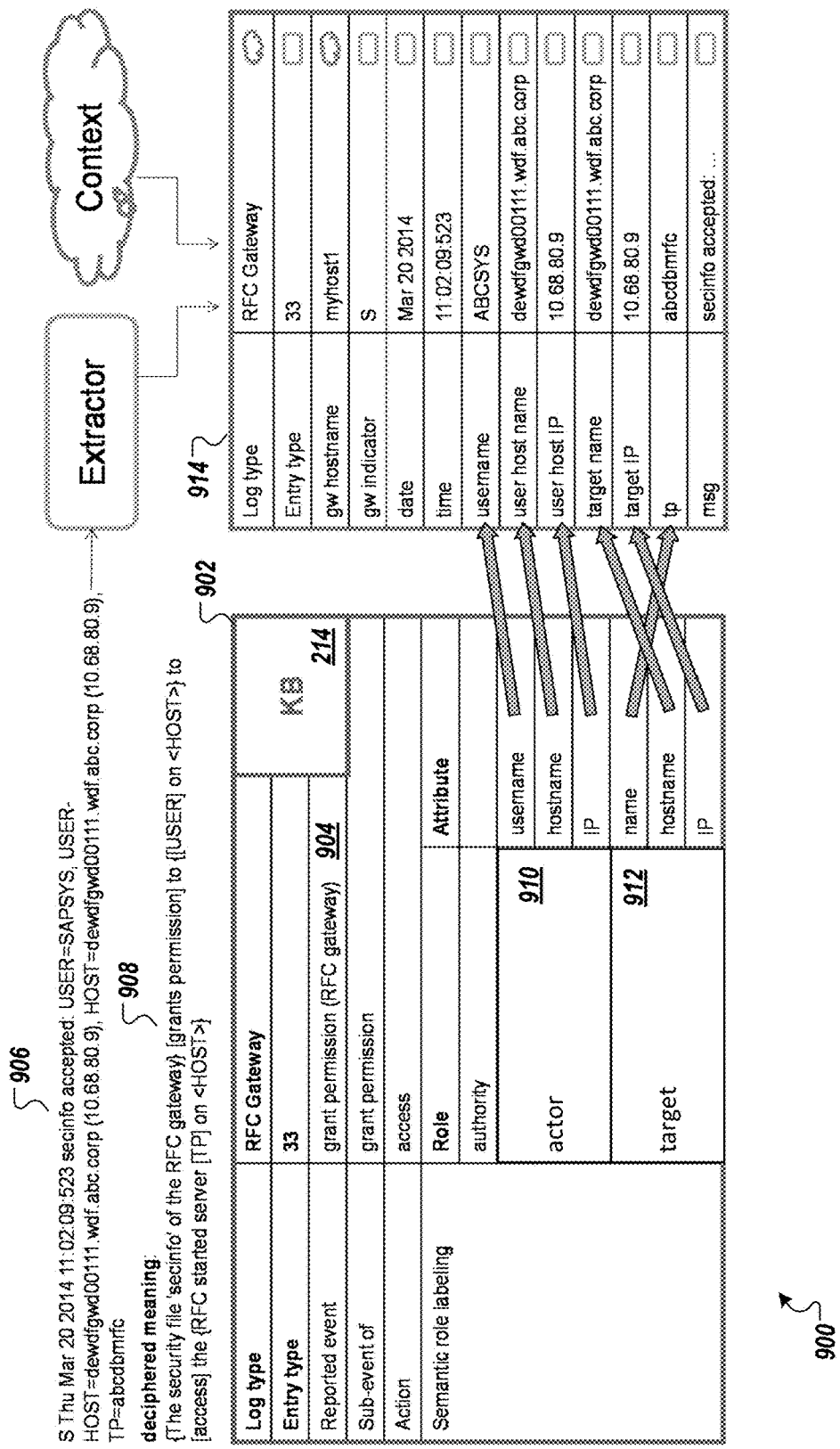
FIG. 9 is a diagram that illustrates semantic information that is stored in a knowledge base for a semantic event type that is associated with a log entry, according to an implementation.

FIG. 9 is a diagram 900 that illustrates semantic information 902 that is stored in the knowledge base 214 for a semantic event type 904 that is associated with a log entry 906, according to an implementation. The semantic information 902 can be determined at least in part based on a deciphered meaning 908 determined for the log entry 902. The semantic information 902 includes identified semantic actor and target roles 910 and 912, respectively. The actor 910 and target 912 roles can be assigned to semantic attributes which correspond to values included in extracted/enriched values 914 associated with the log entry 906.

Figure 10:
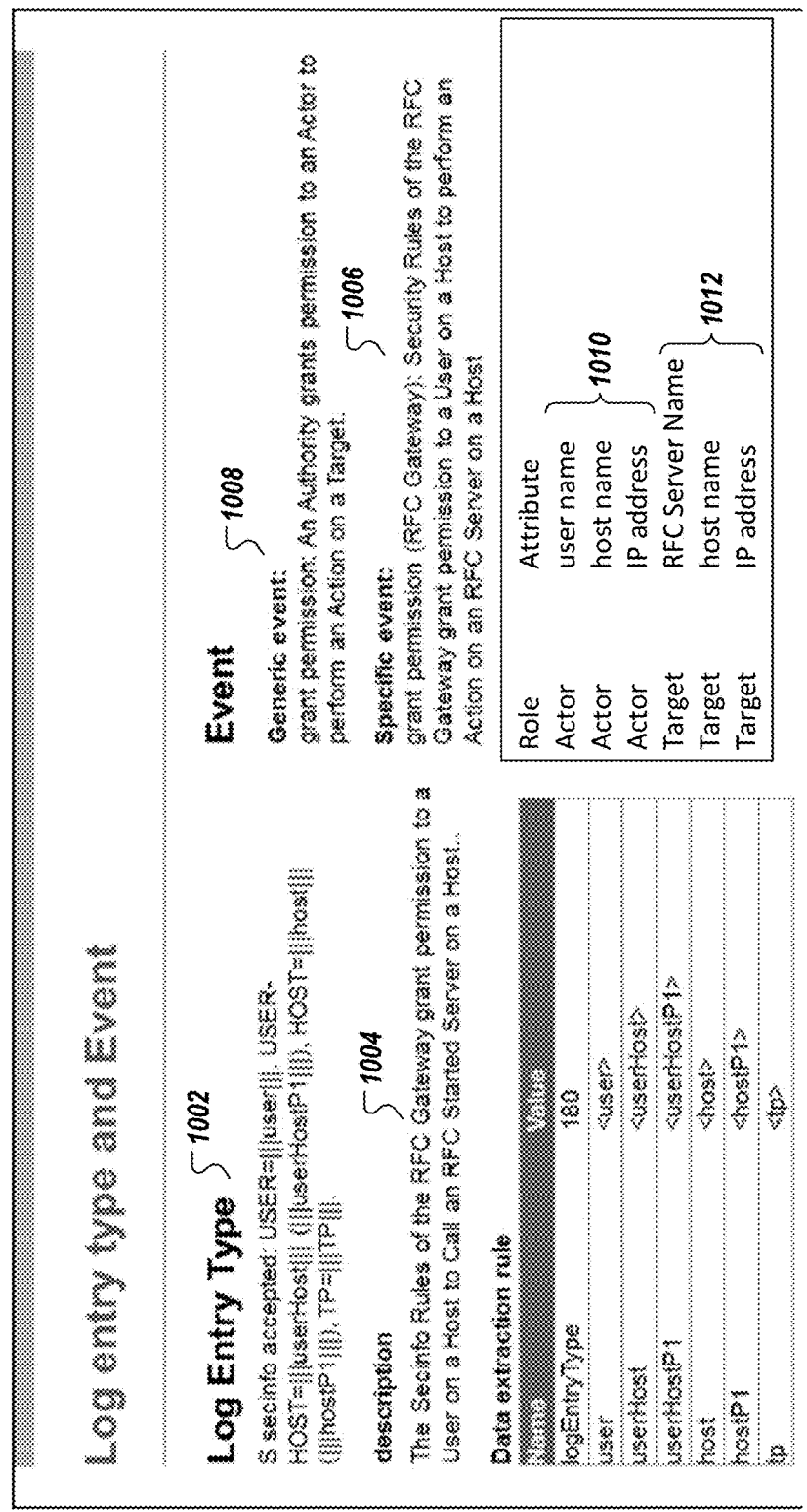
FIG. 10 is a diagram that illustrates semantic modeling for a log entry type, according to an implementation.

FIG. 10 is a diagram 1000 that illustrates semantic modeling for a log entry type 1002, according to an implementation. The log entry type 1002 is represented by a markup string that describes a format of a class of log entries. A semantic description 1004 describes that a log entry of the log entry type 1002 indicates that "the SecInfo rules of the RFC gateway grant permission to a user on a host to call an RFC Started Server on a host." A specific event (semantic event) 1006 corresponds to the description (semantic description) 1004 and is associated with the log entry type 1002. The semantic event 1006 is a specific event instance of a generic event type 1008. An actor semantic role is associated with the semantic event 1006 and with actor-related semantic attributes 1010. A target semantic role is associated with the semantic event 1006 and with target-related semantic attributes 1012.

Figure 11:
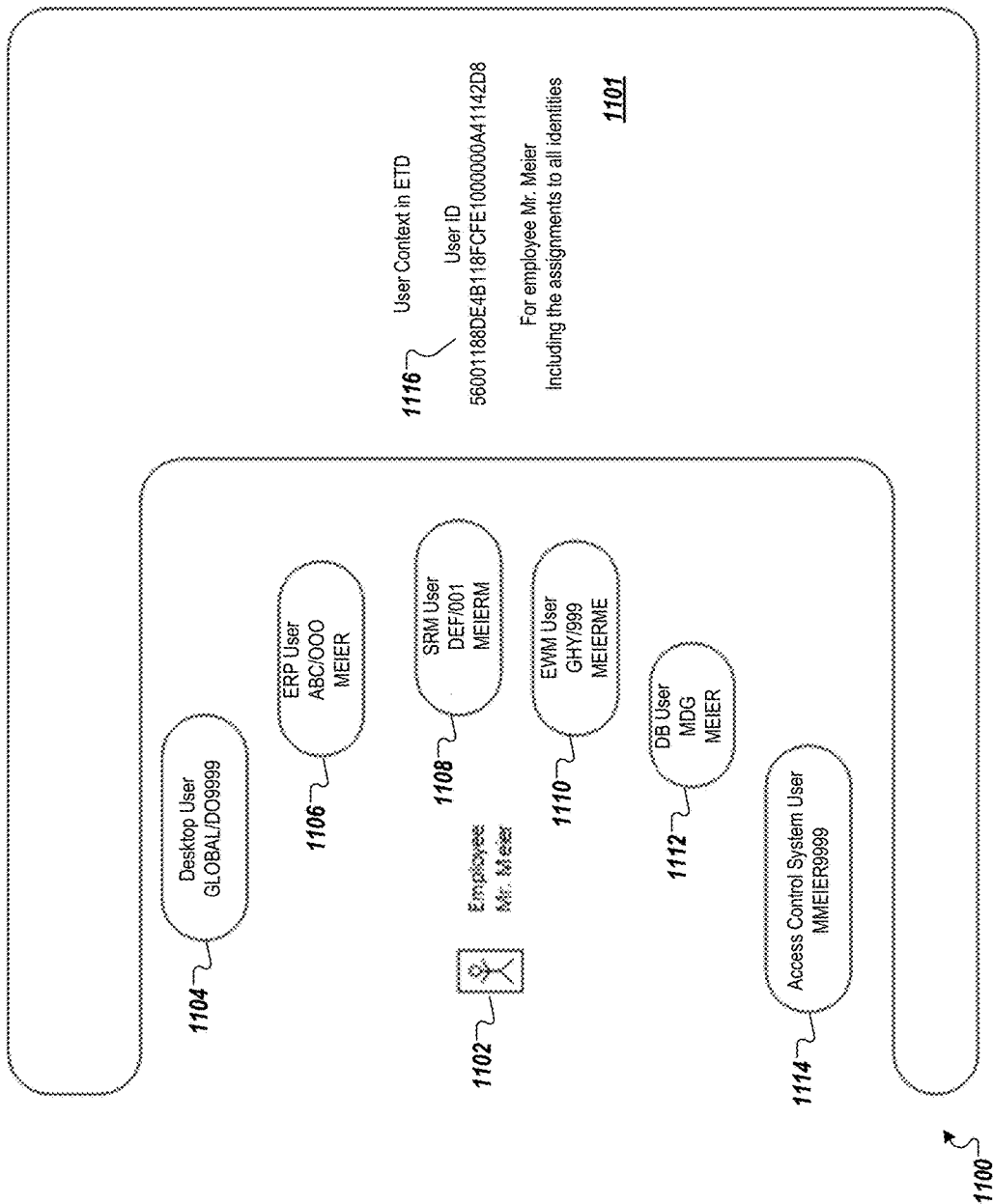
FIG. 11 illustrates an example system 1100 that illustrates a user context for a user, according to an implementation.

FIG. 11 illustrates an example system 1100 that illustrates a user context 1101 for a user 1102, according to an implementation. The user 1102 (e.g., Mr. Meier) can have numerous, different user identifiers associated with numerous, different log providing systems 102. For example, the user 1102 can be associated with user identifiers 1104, 1106, 1108, 1110, 1112, and 1114 for use in desktop, ERP (Enterprise Resource Planning), SRM (Supplier Relationship Management), EWM (Extended Warehouse Management), DB (Database), and Access Control systems, respectively.

The user identifiers 1104-1114 can each be associated with a user identifier 1116 associated with the user context 1101. Log data received by (or in some implementations, provided to) the enterprise threat detection system 108 that includes one of the user identifiers 1104-1114 can be enriched to include the user identifier 1116, to link the log data with the user context 1101. Enriching log data with the user context identifier 1116 can enable correlation of log data for the user 1102. The enterprise threat detection system 108 can evaluate user activity associated with the user 1102 by identifying enriched log entries that include the user identifier 1116. The user context 1101 can include or otherwise be associated with the user identifiers 1104-1114. The user context 1101 can include other information, such as information about roles associated with the user 1102, or information about systems which the user 1102 uses.

Figure 12:
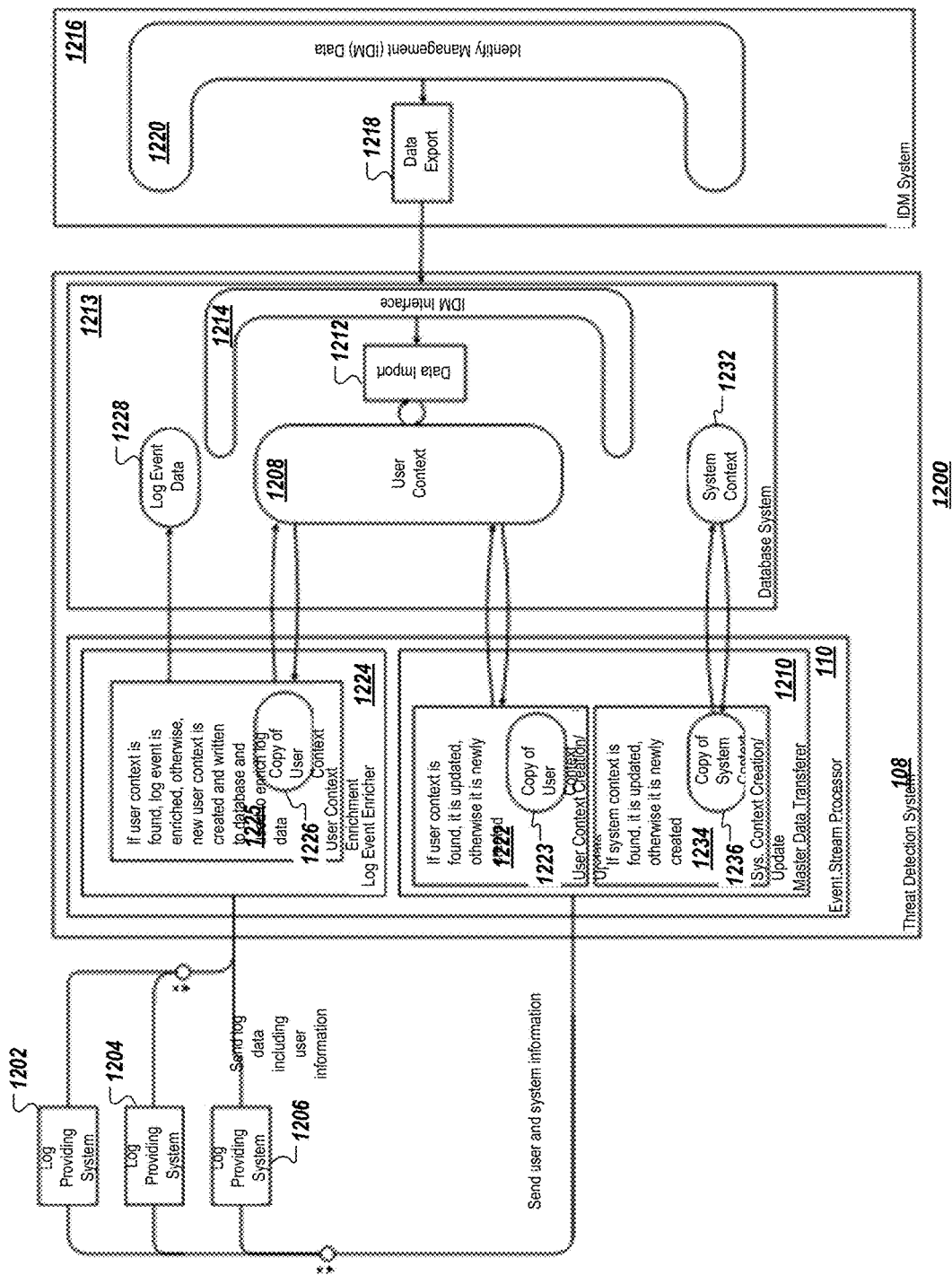
FIG. 12 illustrates an example system for creating and maintaining user and system context information, according to an implementation.

FIG. 12 illustrates an example system 1200 for creating and maintaining user and system context information, according to an implementation. The event stream processor 110 can correlate log data associated with a user by associating log data for the user received from different log providing systems 1202, 1204, and 1206 with a common user context 1101 stored in a user context repository 1208. The event stream processor 110 can create an initial user context 1101 for a user and can maintain the user context 1101.

The user context 1101 can be populated by one or more of a master data transferer 1210 or an identity management (IDM) importer 1212. The IDM importer 1212 included in a database system 1213 can communicate with or otherwise use an IDM interface 1214 provided by an IDM system 1216. The IDM system 1216 is a system for managing user identities in the system landscape monitored by the threat detection system 108. A data exporter 1218 can export IDM data 1220 included in the IDM system 1216 and provide the exported data to the data importer 1212 included in the database system 1213, using the IDM interface 1214. In some implementations, the IDM importer 1212 pulls data from the IDM exporter 1218 using the IDM interface 1214. In some implementations, the IDM exporter 1218 pushes data to the IDM importer 1212 using the IDM interface 1214. The IDM importer 1212 can insert received IDM data into the user context repository 1208, for use by the threat detection system 108. The IDM importer 1212 can determine whether received data exists or corresponds to existing information in the user context repository 1208, and can either update existing record(s) or create new record(s) in the user context repository 1208.

The master data transferer 1210 can receive user information from the log providing systems 1202, 1204, and 1206. In some implementations, user information from the log providing systems 1202, 1204, and 1206 is received by the event stream processor 110 in a JSON (JavaScript Object Notation) format. A user context creator/updater 1222 can determine whether user information received for a user from the log providing systems 1202, 1204, and 1206 corresponds to an existing user context 1101 in the user context repository 1208 (e.g., by comparing the received user information to a cached copy 1223 of the user context repository 1208). If the received user information corresponds to an existing user context 1101, the existing user context 1101 for the user is updated in the user context repository 1208 to include the received user information. If the received user information does not correspond to an existing user context 1101, a new user context 1101 is created for the user in the user context repository 1208 and populated with the received user information.

In some implementations, user information is pushed by the log providing systems 1202, 1204, and 1206 to the master data transferer 1210. In some implementations, user information is pulled by the master data transferer 1210 from the log providing systems 1202, 1204, and 1206. For a particular log providing system 1202, 1204, or 1206, both an initial push or pull of master user data and periodic (e.g., hourly) pushes or pulls of master user data can be configured to be performed, for initial population and updates of the user context information 1101 for a given user.

A log event enricher 1224 included in the event stream processor 110 can perform an enrichment process 1225 to enrich log data received from the log providing systems 1202, 1204, and 1206 with user context information when the received log data is associated with a user of the EDCS 100. For example, the log data enricher 1224 can determine that received log data includes user identifying information (e.g., user identifier, user email address, user system name) associated with a particular log providing system 1202, 1204, and 1206.

The log event enricher 1224 can determine whether the user identifying information corresponds to a user context 1101 stored in the user context repository 1208 (e.g., by searching a cached copy 1226 of the user context repository 1208 for the user identifying information). If the user identifying information corresponds to an existing user context 1101, the received log data can be enriched to include, for example, a user context identifier associated with the user context 1101, for storage in the database system 1213 as enriched log data 1228. In some implementations, the original user identifying information received from the log providing system 1202, 1204, or 1206 is removed from the received log data and not stored in the enriched log data 1228 (e.g., the user context identifier, but not the received user identifying information, may be stored). If the user identifying information in the received log data does not correspond to an existing user context 1101, the log event enricher 1224 can create a new user context 1101 based on the received user identifying information, determine a user context identifier associated with the new user context 1101, and store the user context identifier with the received log data in the enriched log data 1228.

In some implementations, log data is pushed by the log providing systems 1202, 1204, and 1206 to the log event enricher 1224. In some implementations, log data is pulled by the log event enricher 1224 from the log providing systems 1202, 1204, and 1206. The enrichment process 1225 can be configured to be performed, for example, once per minute, or at some other frequency.

In some implementations, the user context 1101 for a particular user is represented in data included in a set of tables in the database system 1213. For example, a User Header table can include a record for each user that includes the user context identifier, user type and role information, and validity information. A User HR Data table can include, for example, human resources information associated with the user. A User System Data table can include one or more entries that each include user identifying information for the user that is associated with a particular log providing system 1202, 1204, or 1206.

System context information 1232 can include information about the log providing systems 1202, 1204, and 1206 that may be used, for example, by the threat detection system 108 for log data interpretation and analysis. The system context information 1232 can include, for example, information about a system role (e.g., production, test, or development), technical type (e.g., Java system, application server, or database system), and system status (e.g., active, inactive, or validity date(s)) of a log providing system 1202, 1204, or 1206. If a log providing system 1202, 1204, or 1206 is an application server, application server information such as operating system, version, and kernel can be stored in the system context information 1232.

The system context information 1232 can include business and technical contact information, which can be used, for example, to contact a relevant administrator if a threat associated with a given log providing system 1202, 1204, or 1206 is detected by the threat detection system 108. Role, system status and other information can be used by the threat detection system 108 to determine a severity of a detected threat. For example, a threat associated with a production system can be ranked as a higher threat than an otherwise equivalent threat detected for a test system. Other system context information examples are described in more detail below, with respect to FIGS. 22-24.

The system context information 1232 can be created and maintained, for example, by administrator(s) of the threat detection system 108 using administrator user interface(s) provided by the threat detection system 108. As another example, the master data transferer 1210 can perform a system context creation/update process 1234 to create or update system context information 1232 stored in the database system 1213. The master data transferer 1210 can receive system context information from the log providing systems 1202, 1204, and 1206. In some implementations, system context information from the log providing systems 1202, 1204, and 1206 is received by the event stream processor 110 in a JSON (JavaScript Object Notation) format. The master data transferer 1210 can determine whether system context information received from the log providing systems 1202, 1204, and 1206 corresponds to an existing system context entry in the system context information 1232 (e.g., by comparing the received system context information to a cached copy 1236 of the system context information 1232). If the received system context information corresponds to an existing entry in the system context information 1232, the existing entry is updated. If the received system context information does not correspond to an existing entry in the system context information 1232, a new entry is created in the system context information 1232 and populated with the received system context information.

In some implementations, system context information is pushed by the log providing systems 1202, 1204, and 1206 to the master data transferer 1210. In some implementations, system context information is pulled by the master data transferer 1210 from the log providing systems 1202, 1204, and 1206. For a particular log providing system 1202, 1204, or 1206, both an initial push or pull of master system data and periodic (e.g., hourly) pushes or pulls of master system data can be configured to be performed, for initial population and updates of the system context information 1232.

Figure 13:
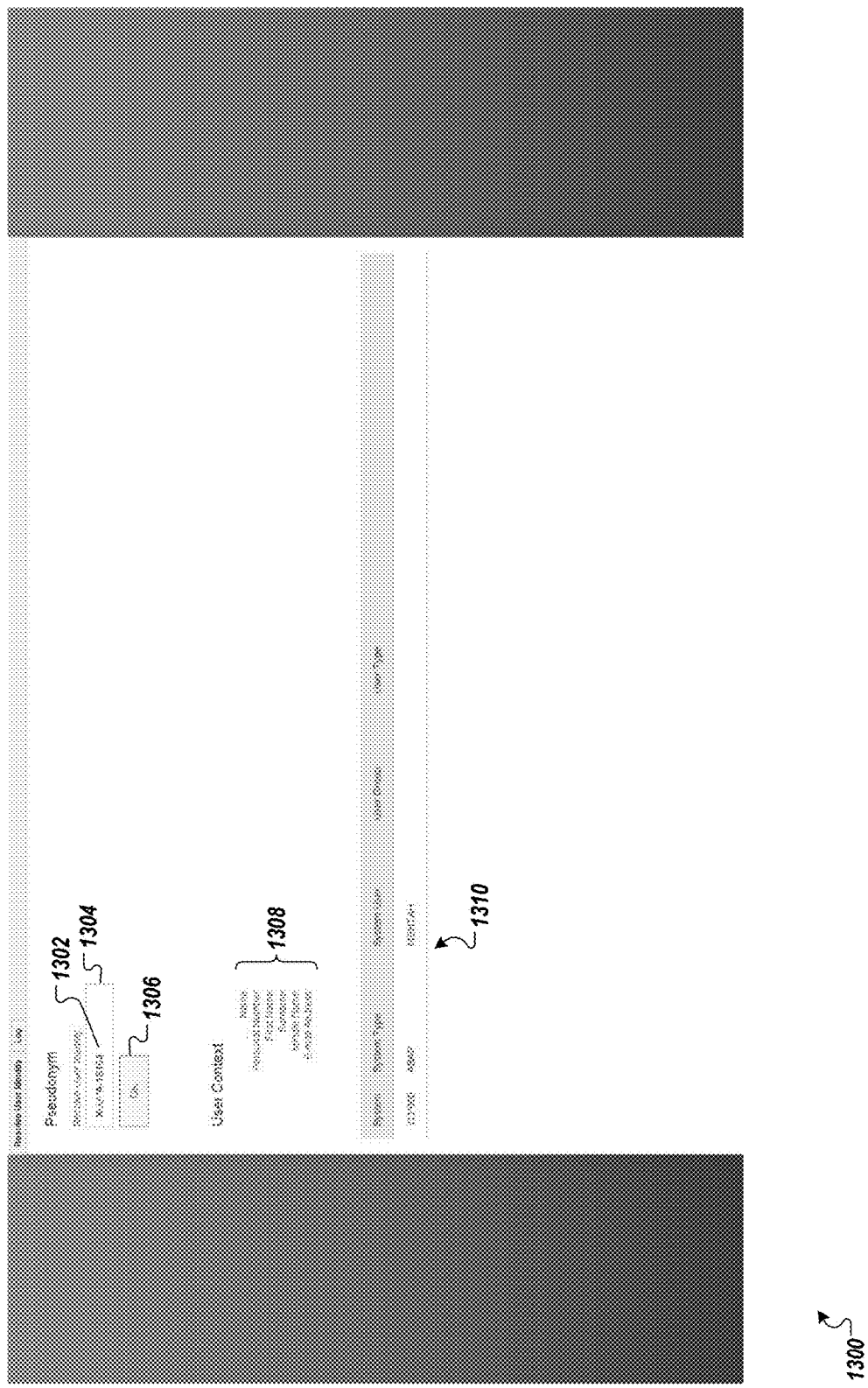
FIG. 13 illustrates an example resolve user identity user interface, according to an implementation.

FIG. 13 illustrates an example resolve user identity user interface 1300, according to an implementation. For display purposes, a user pseudonym can be created for the user 1102 that corresponds to the user context identifier 1116. The user pseudonym can be, for example, a randomly generated identifier that does not include any identifying information about the user 1102, such as personal information, information about the user identifiers 1104-1114, etc. For privacy considerations, user pseudonyms can be periodically regenerated, so that different user pseudonym are used for a same user over time.

The user interface 1300 enables an administrator to view user information associated with a user pseudonym when an occasion arises where viewing such information is necessary. For example, the administrator may have observed or been notified of suspicious activity associated with a user pseudonym 1302, and the organization may desire to know the actual user associated with the user pseudonym, for investigation purposes. The user interface 1300 may be accessible only to certain administrator users, for privacy considerations.

The user pseudonym 1302 can be entered or selected using an entry field 1304. As another example, the entry field 1304 may be automatically populated with the user pseudonym 1302 as a result of the administrator selecting the user pseudonym 1302 on another user interface. The administrator can select a control 1306 to view user information associated with the user pseudonym 1302. In response to selection of the control 1306, user information associated with the user pseudonym 1302 can be displayed in a user context area 1308. The user information can include, for example, name information, a personal number (e.g., employee identifier), and an email address. System information for systems for which the user has accounts can be displayed in a system information area 1310. The system information can include, for each system for which the user has an account, a system name, system type, system user name, user group, and user type.

Figure 14:
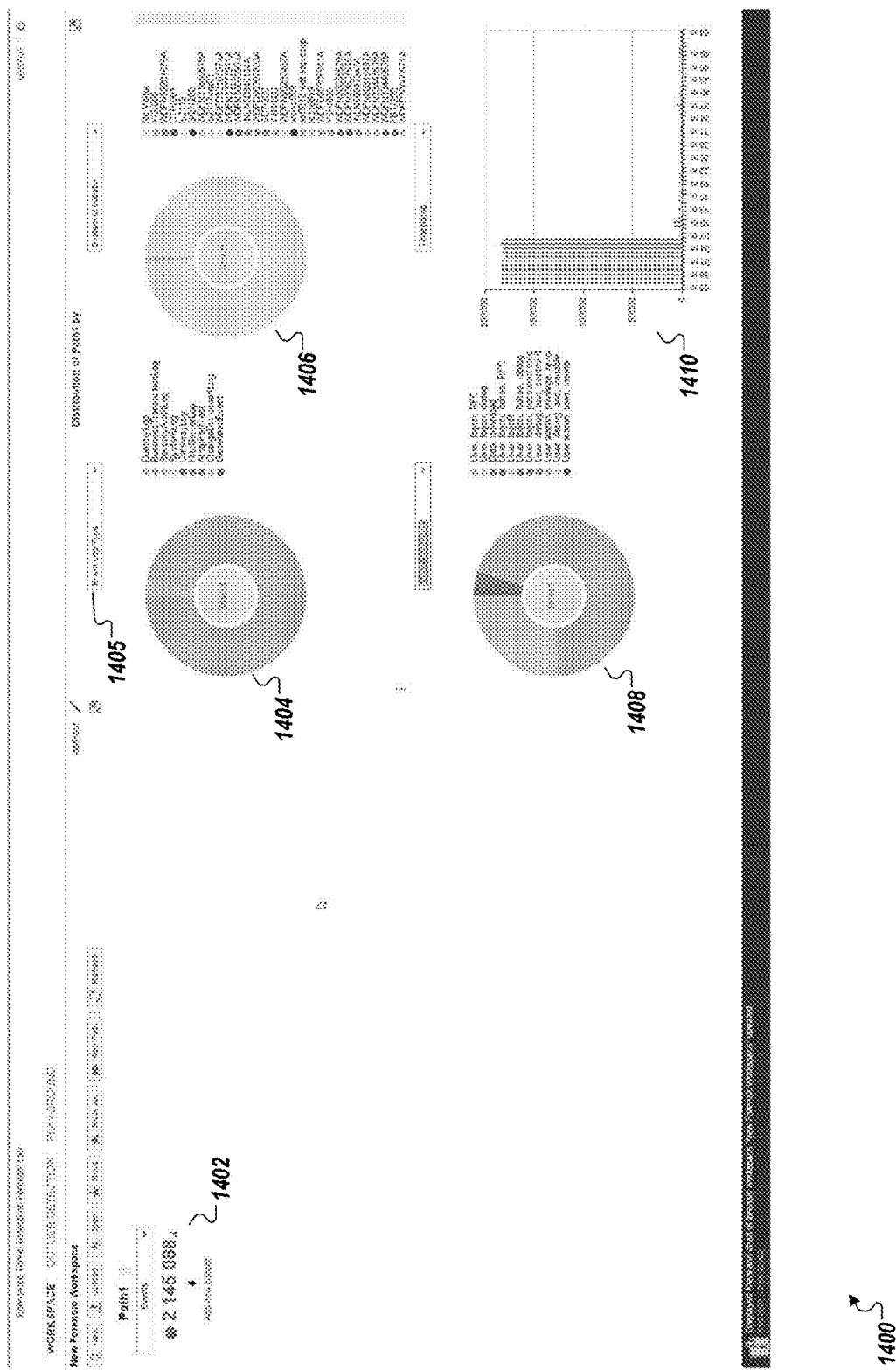
FIG. 14 illustrates an example forensic lab user interface, according to an implementation.

FIG. 14 illustrates an example forensic lab user interface 1400, according to an implementation. The user interface can be used, for example, by an administrator to examine events, alerts, and system health checks to identify and analyzing attacks. A label 1402 indicates that 2,145,088 events have occurred in the past hour. A chart 1404 illustrates a distribution of events occurring in the past hour according to event log type attribute values. For example, the user can select the event log type attribute value type using a selection control 1405. The user can use the selection control 1405 to select a different attribute type for displaying a different distribution in the chart 1404. Selectable attribute types can correspond, for example, to information stored in the knowledge base 214 or to system context information 1232. A chart 1406 illustrates a distribution of events occurring in the past hour according to initiating system attribute values. A chart 1408 illustrates a distribution of events occurring in the past hour according to semantic event type attribute values. A chart 1410 illustrates a distribution of events occurring in the past hour according to timestamp attribute values.

Figure 15:
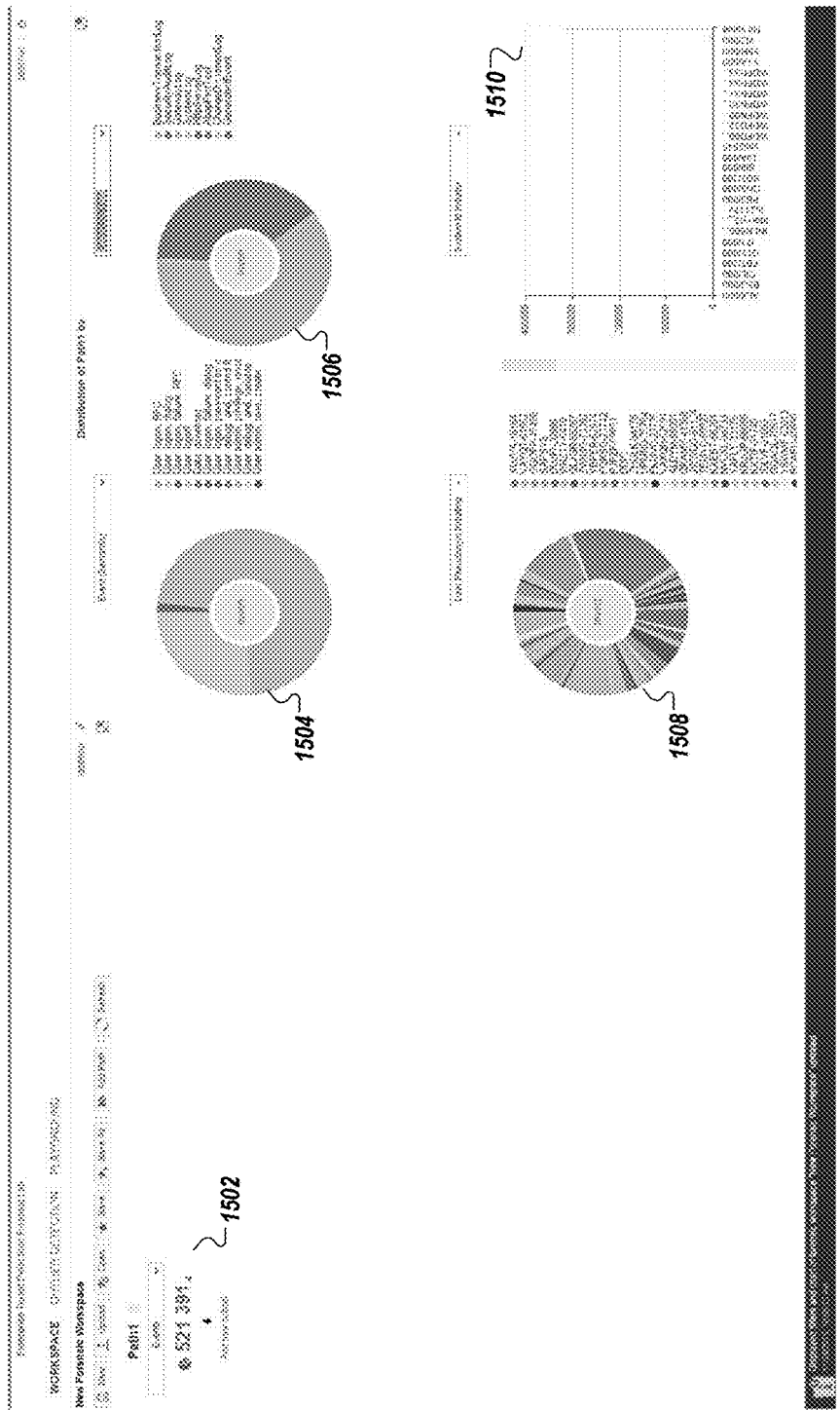
FIG. 15 illustrates another example forensic lab user interface, according to an implementation.

FIG. 15 illustrates another example forensic lab user interface 1500, according to an implementation. For example, the user interface 1500 illustrates the display of different charts that show a set of different distributions of events occurring at a different time, as compared to the user interface 1400. For example, a label 1502 indicates that 521,391 events have occurred in the past hour. A chart 1504 illustrates a distribution of events occurring in the past hour according to semantic event type attribute values. A chart 1506 illustrates a distribution of events occurring in the past hour according to event log type attribute values. A chart 1508 illustrates a distribution of events occurring in the past hour according to initiating user pseudonym attribute values. A chart 1510 illustrates a distribution of events occurring in the past hour according to initiating system attribute values.

Figure 16:
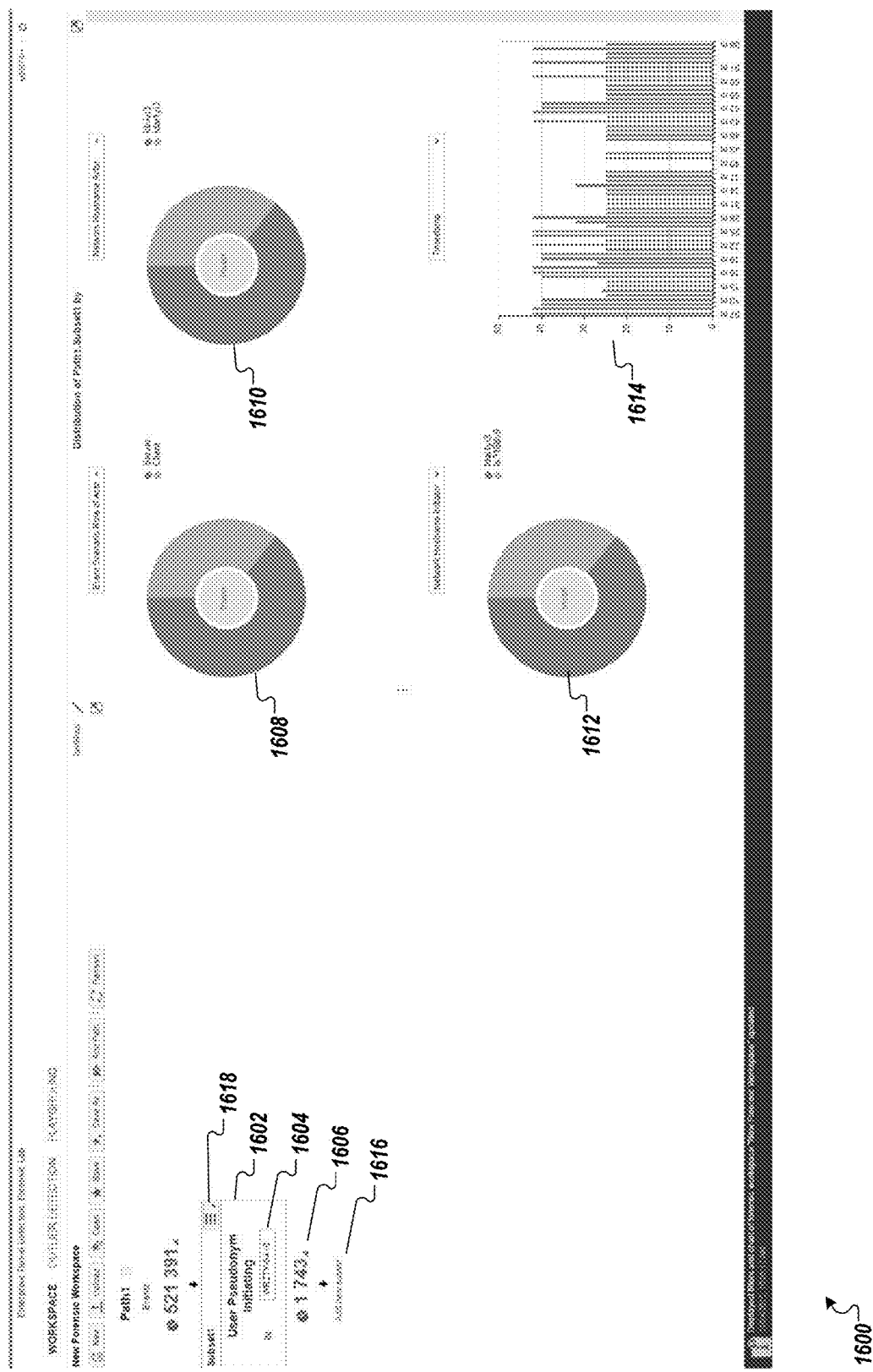
FIG. 16 illustrates another example forensic lab user interface, according to an implementation.

FIG. 16 illustrates another example forensic lab user interface 1600, according to an implementation. In addition to viewing distributions of a set of events, the forensic lab user interface 1600 can enable the user to view distributions related to particular subsets of events. For example, a filter control 1602 has been added to the user interface 1600 to enable the user to filter events by a particular user pseudonym. The user has used a selection control 1604 to select or enter a user pseudonym of "WRZTY-6410". A label 1606 indicates that a subset of 1,743 events occurring in the past hour correspond to the selected user pseudonym. Charts 1608, 1610, 1612, and 1614 display distributions of the events in the subset, according to event scenario role of actor, network hostname actor, network hostname initiator, and timestamp attributes, respectively. The user can select a link 1616 to add another subset (e.g., to further filter the displayed subset). The user can select a control 1618, for example, to view and select a view raw data menu item that will result in the display of detailed information about the events in the displayed subset.

Figure 17:
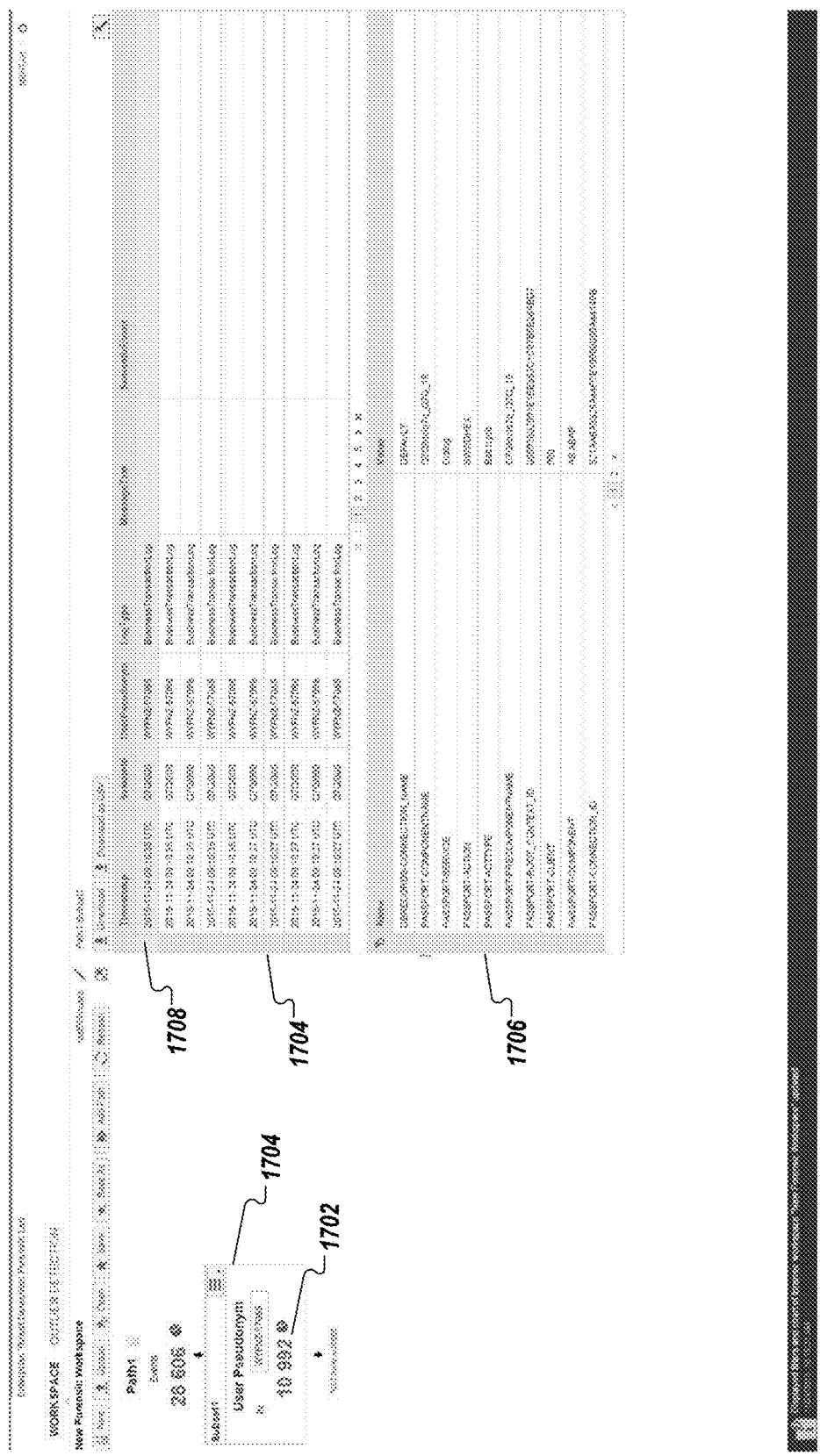
FIG. 17 illustrates another example forensic lab user interface, according to an implementation.

FIG. 17 illustrates another example forensic lab user interface 1700, according to an implementation. The user has selected a label 1702 representing events in a subset corresponding to a filter control 1704, to view detailed information regarding events in the subset. In response to selection of the label 1702, a list area 1704 and a detail area 1706 can be displayed in the user interface 1700. The list area 1704 displays information for events in the subset, one event per row. The detail area 1706 displays detailed information for a selected event. For example, the detail area 1706 displays detailed information for an event corresponding to a selected row 1708.

Figure 18:
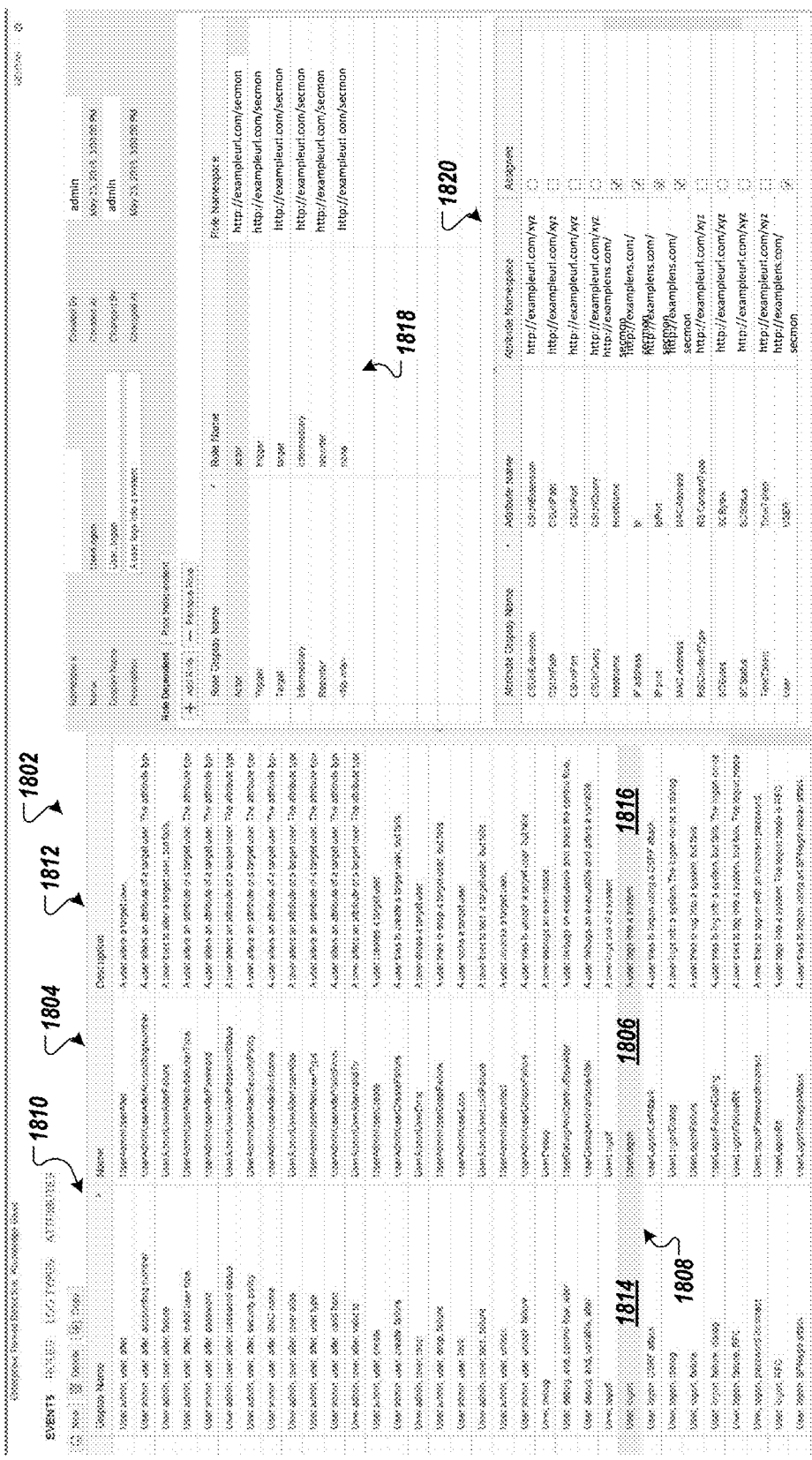
FIG. 18 illustrates an example event information user interface, according to an implementation.

FIG. 18 illustrates an example event information user interface 1800, according to an implementation. The user interface 1800 can be used to view information about events that are defined in the knowledge base 214. An event list 1802 displays information for defined events, with one row per defined event. An event name column 1804 includes knowledge base names of defined events. For example, a name 1806 of a selected event 1808 is "UserLogon." Display name 1810 and description columns 1812 respectively include presentation names (e.g., as shown on user interfaces) and descriptions of events. For example, a display name 1814 and a description 1816 of the selected event 1808 are "User, logon," and "A user logs into a system," respectively.

A role area 1818 displays information associated with roles that are associated with a selected event. For example, the roles area 1818 indicates that the selected event 1808 is associated with actor, trigger, target, intermediary, and reporter roles. An attribute area 1820 displays information related to attributes that are associated with the selected event 1808.

Figure 19:
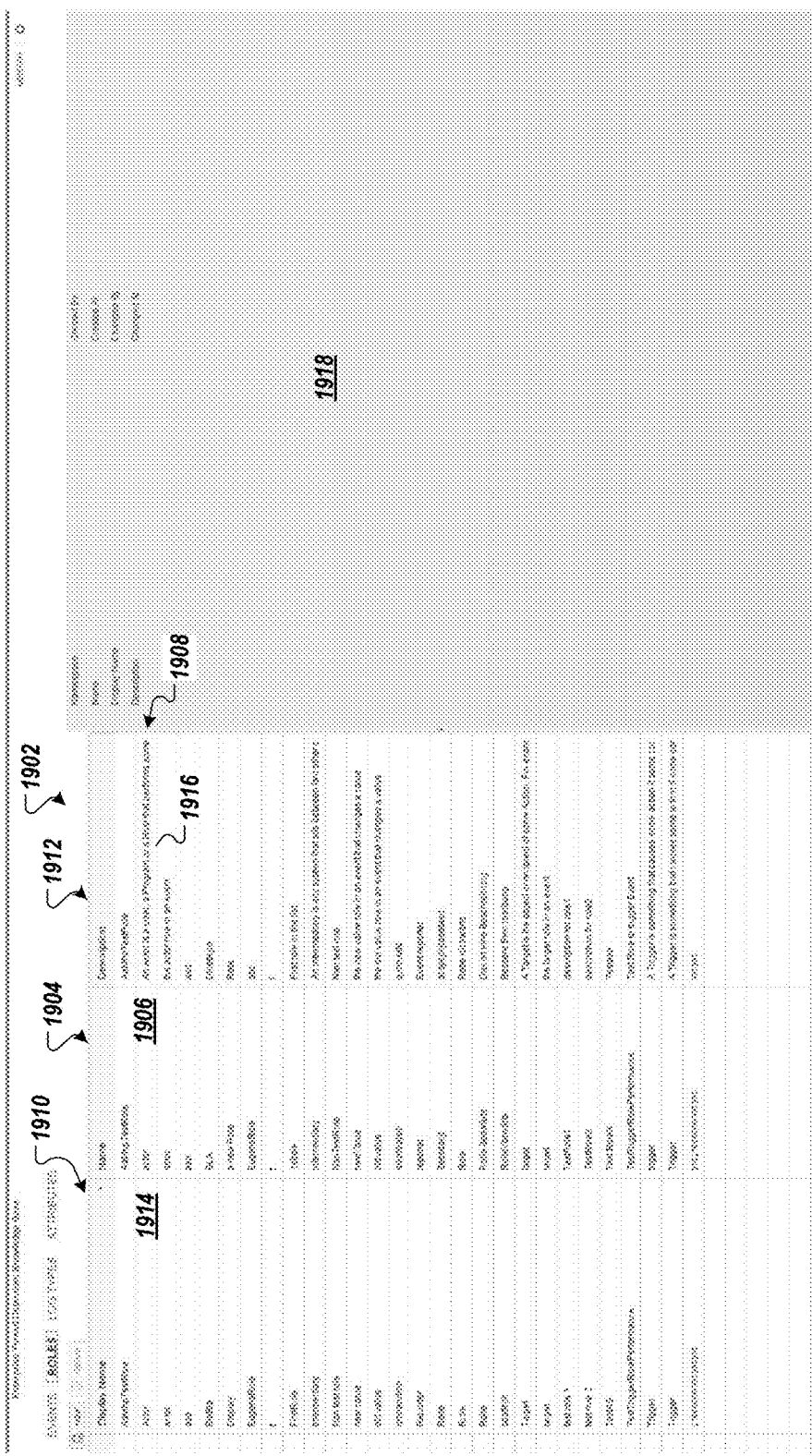
FIG. 19 illustrates an example role information user interface, according to an implementation.

FIG. 19 illustrates an example role information user interface 1900, according to an implementation. The user interface 1900 can be used to view information about roles that are defined in the knowledge base 214. A role list 1902 displays information for defined roles, with one row per defined role. A role name column 1904 includes knowledge base names of defined roles. For example, a name 1906 of a role associated with a row 1908 is "actor". Display name 1910 and description columns 1912 respectively include presentation names (e.g., as shown on user interfaces) and descriptions of roles. For example, a display name 1914 and a description 1916 of the role associated with the row 1908 are "Actor," and "An Actor is a User, a Program, or a Host that performs some action," respectively. Additional information associated with a role can be displayed in a detail area 1918, such as in response to selection of a particular row in the role list 1902.

Figure 20:
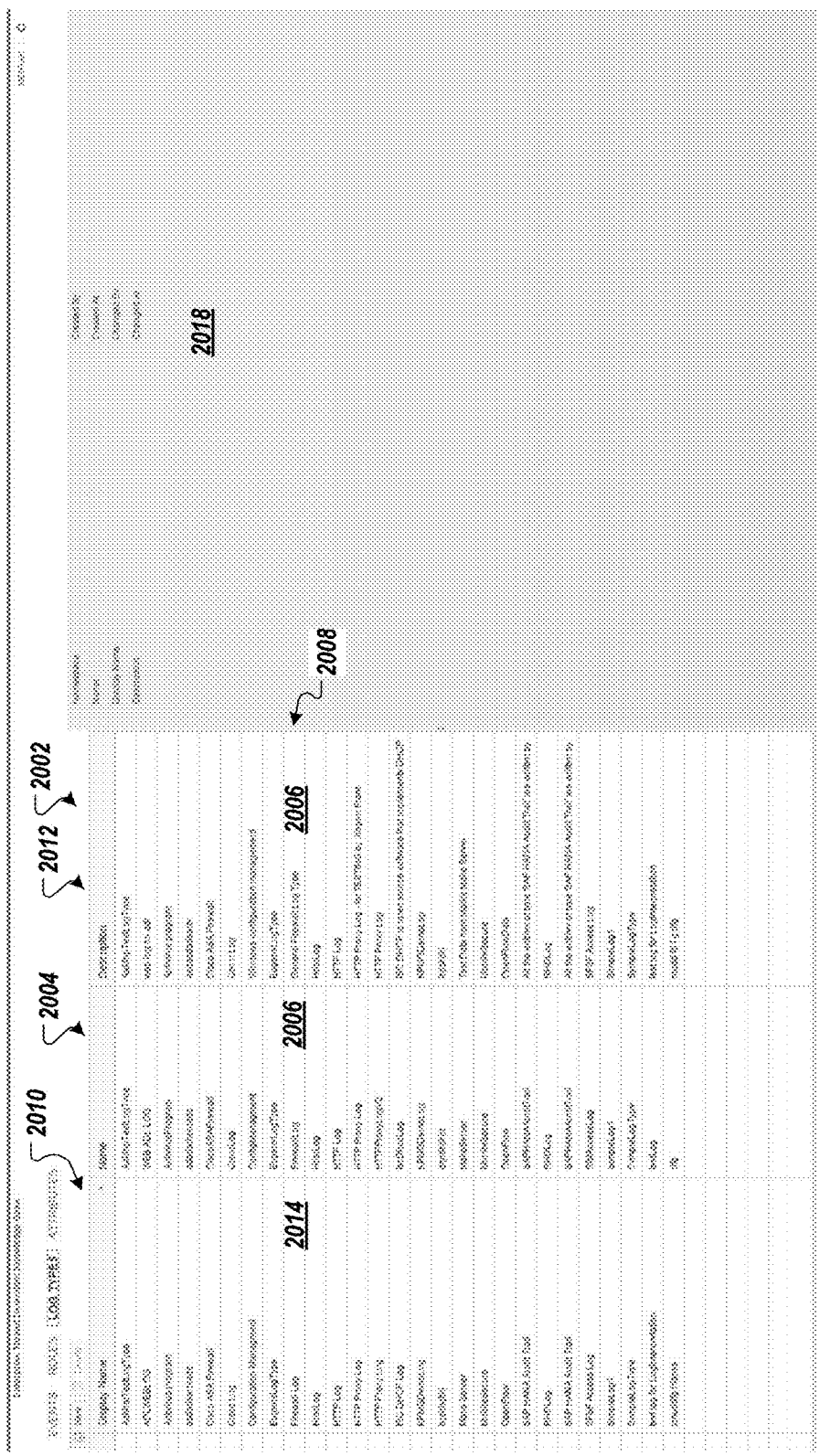
FIG. 20 illustrates an example log type information user interface, according to an implementation.

FIG. 20 illustrates an example log type information user interface 2000, according to an implementation. The user interface 2000 can be used to view information about log types that are defined in a knowledge base. A log type list 2002 displays information for defined log types, with one row per defined log type. A log type name column 2004 includes knowledge base names of defined log types. For example, a name 2006 of a log type associated with a row 2008 is "FirewallLog," Display name 2010 and description columns 2012 respectively include presentation names (e.g., as shown on user interfaces) and descriptions of log types.

For example, a display name 2014 and a description 2016 of the log type associated with the row 2008 are "Firewall Log," and "General Firewall Log Type," respectively. Additional information associated with a log type can be displayed in a detail area 2018, such as in response to selection of a particular row in the log type list 2002.

Figure 21:
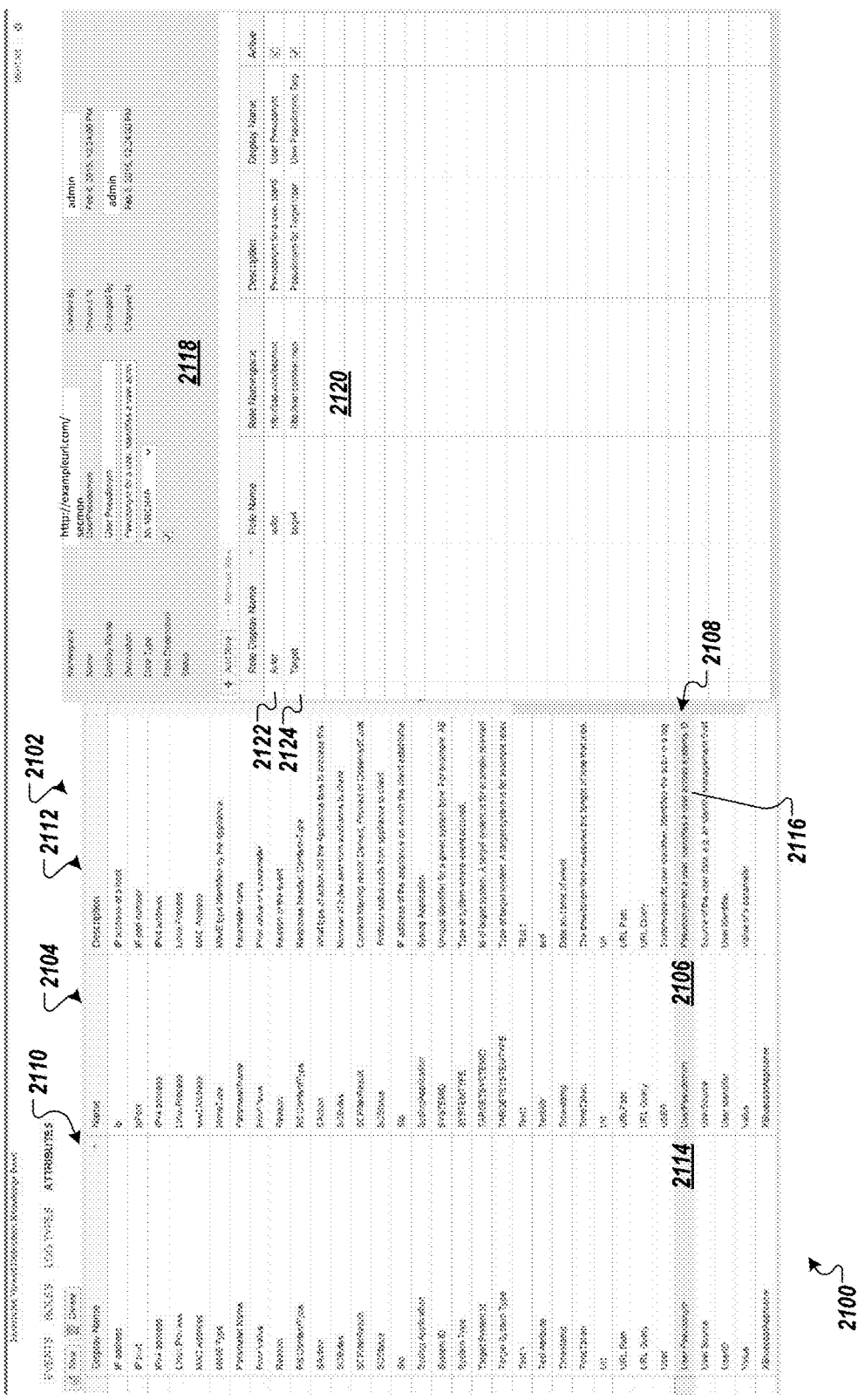
FIG. 21 illustrates an example attribute information user interface, according to an implementation.

FIG. 21 illustrates an example attribute information user interface 2100, according to an implementation. The user interface 2100 can be used to view information about attributes that are defined in the knowledge base 214. An attribute list 2102 displays information for defined attributes, with one row per defined attribute. An attribute name column 2104 includes knowledge base names of defined attributes. For example, a name 2106 of a selected attribute 2108 is "UserPseudonym". Display name 2110 and description columns 2112 respectively include presentation names (e.g., as shown on user interfaces) and descriptions of attributes. For example, a display name 2114 and a description 2116 of the selected attribute 2108 are "User Pseudonym," and "Pseudonym for a user. Identifies a user across systems . . . ," respectively.

Additional information associated with an attribute can be displayed in a detail area 2118, such as in response to selection of the selected attribute 2108. For example, the detail area 2118 displays namespace, data type, role dependency, creation information, and change information. When an attribute is role-dependent, role information for roles associated with the selected attribute 2108 can be displayed in a role information area 2120. For example, the role information area 2120 displays role display name, role name, role namespace, description, display name, and active status information for an actor role 2122 and a target role 2124 that are associated with the selected attribute 2108.

Figure 22:
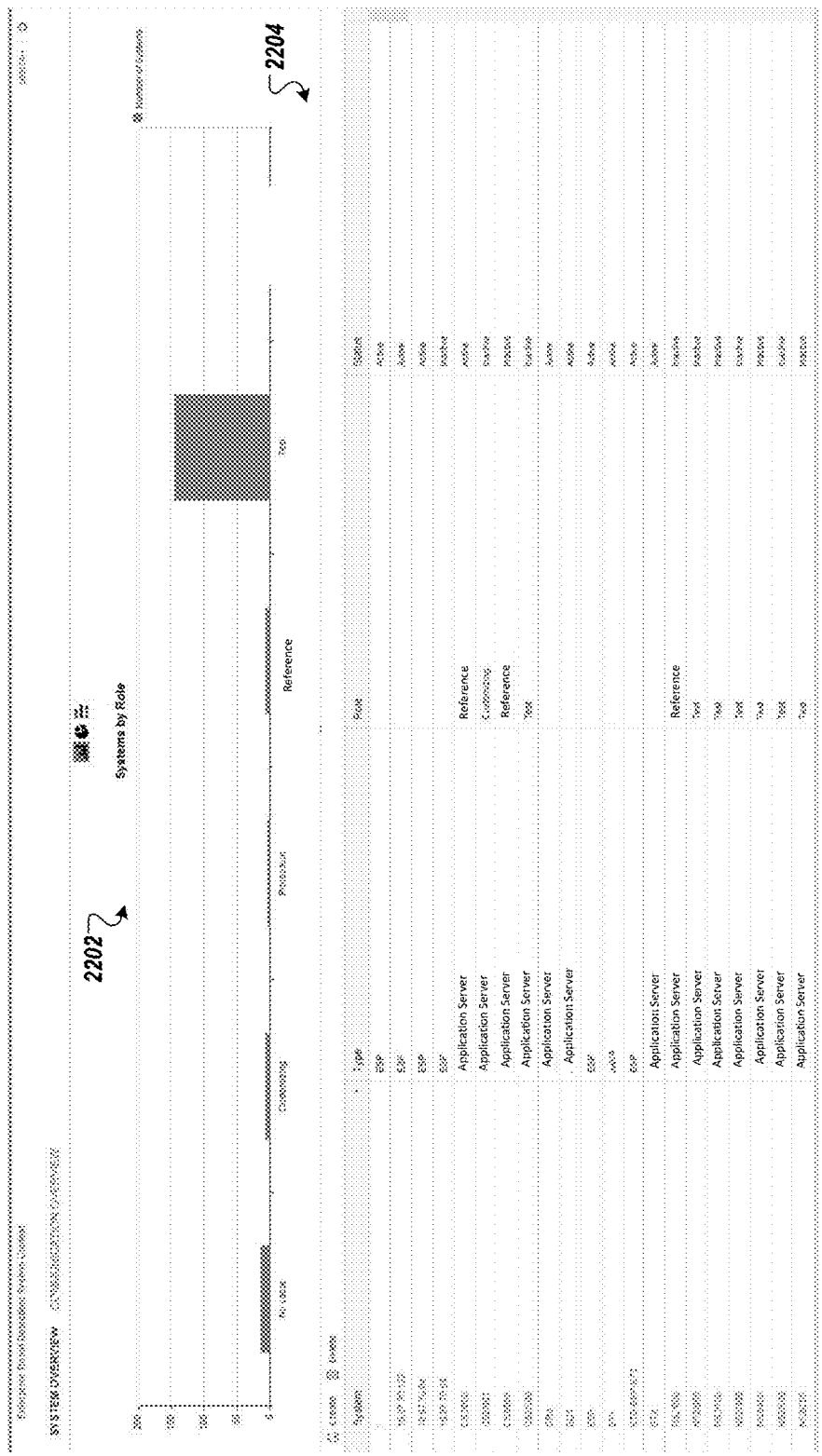
FIG. 22 illustrates an example system overview user interface, according to an implementation.

FIG. 22 illustrates an example system overview user interface 2200, according to an implementation. The user interface 2200 displays information regarding log providing systems 102 that are registered with the enterprise threat detection system 108. A chart 2202 illustrates a distribution of systems according to role. For example, the bars in the chart 2202 indicate a respective number of systems having a customizing, production, reference, test, or undefined role.

Figure 23:
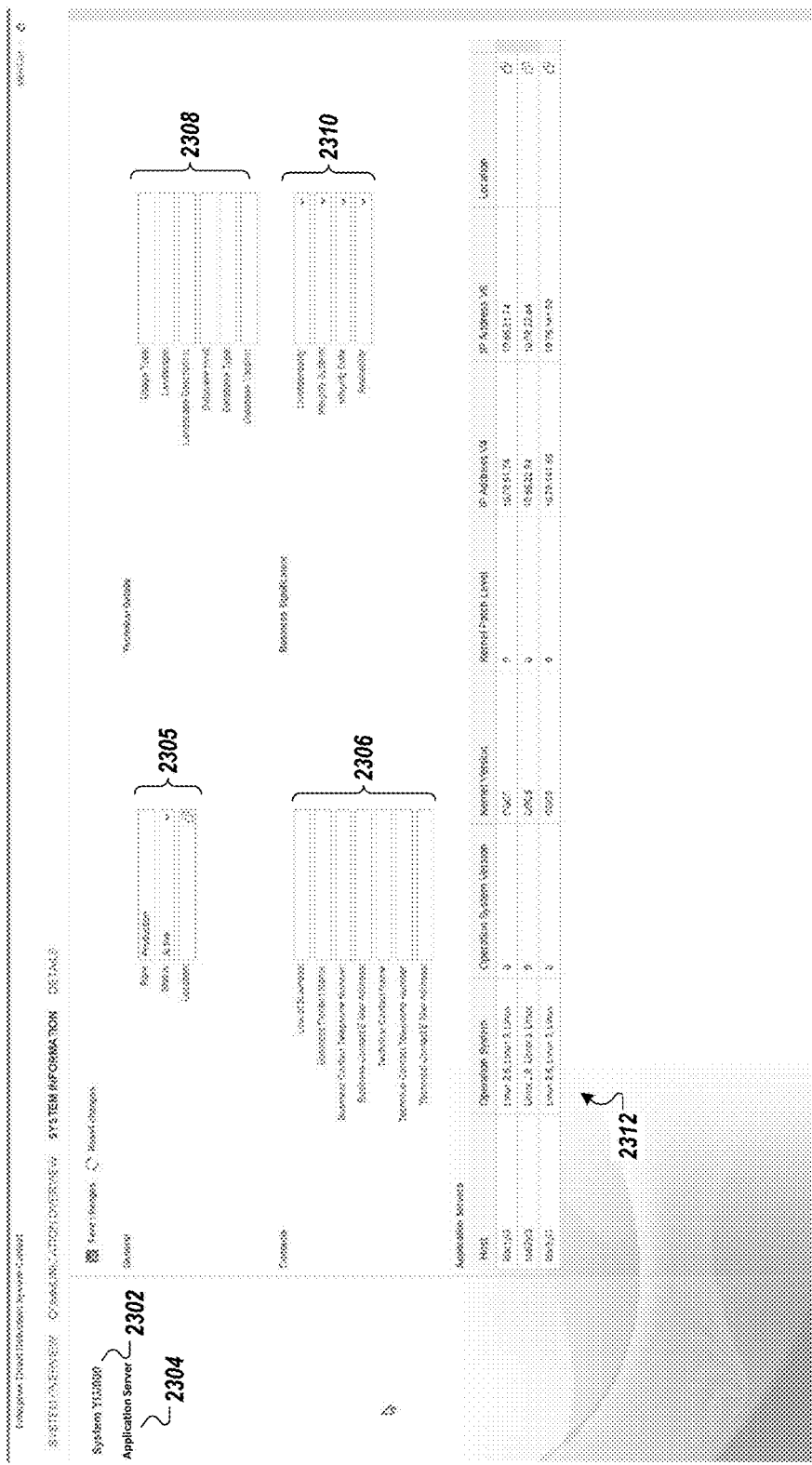
FIG. 23 illustrates an example system information user interface, according to an implementation.

FIG. 23 illustrates an example system information user interface 2300, according to an implementation. The user interface 2300 displays system information for a selected system 2302. The user interface 2300 can be displayed, for example, in response to selection of a system name in another user interface (e.g., the system overview user interface 2200 described above with respect to FIG. 22). The user interface 2300 displays a system type 2304 (e.g., application server, such as an ABAP (Advanced Business Application Programming) system) of the selected system 2302.

The user interface 2300 includes a general area 2305, a contacts area 2306, a technical details area 2308, a business significance area 2310, and an application servers list 2312. The general area 2305 displays, for example, role, status, and location information. The contacts area 2306 displays line of business and business and technical contact information. The technical details area 2308 displays, for example, usage type, landscape, and database information. The business significance area 2310 displays, for example, confidentiality, integrity, and availability information. The application servers list 2312 displays, for each physical application server associated with the selected system 2302, host name, operating system, kernel, IP address, and location information. A system list area 2204 displays information for each registered log providing system 102. For example, the system list area 2204 displays, for each registered log providing system 102, system name, system type, system role, and system status information.

Figure 24:
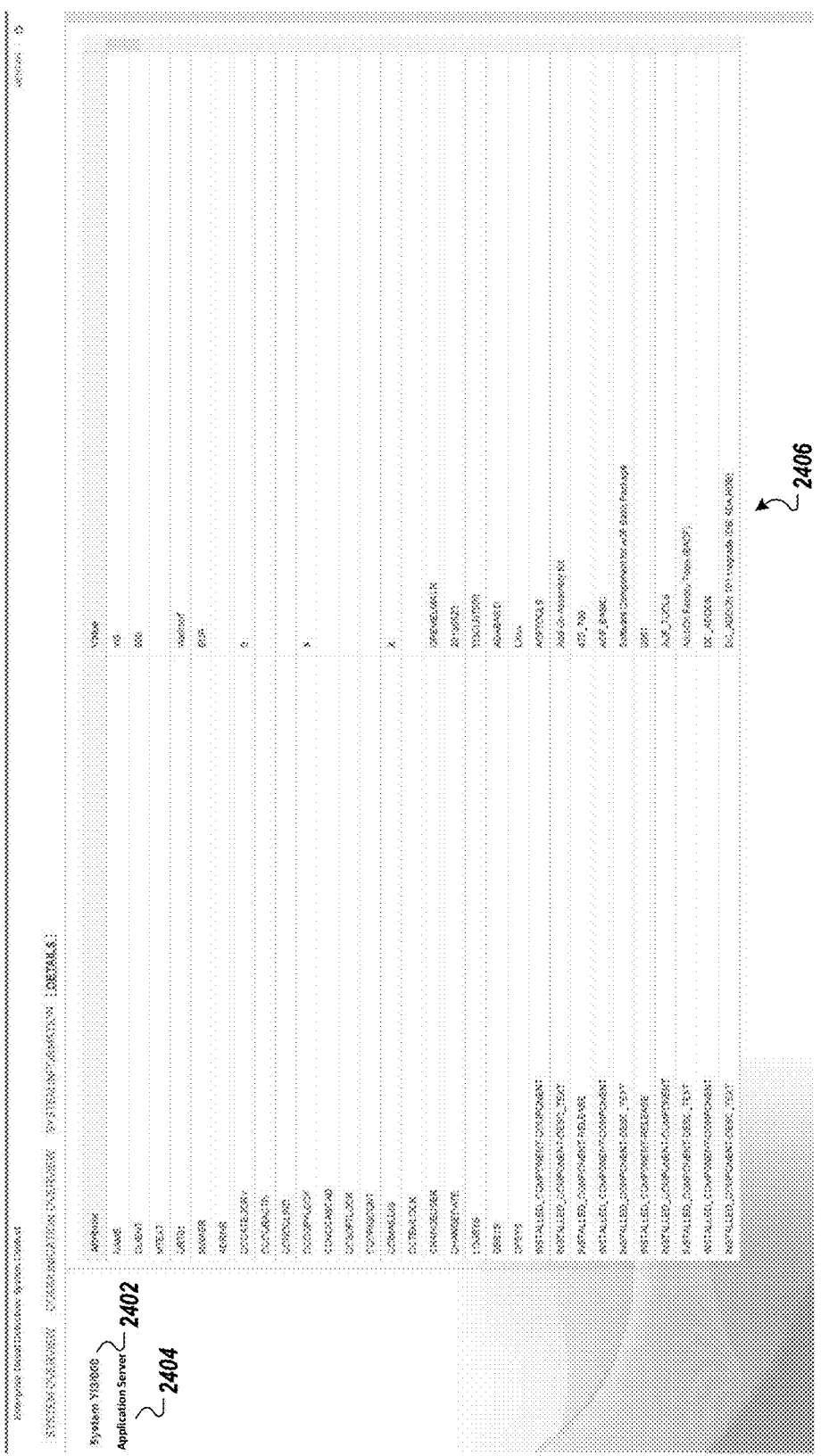
FIG. 24 illustrates an example system details user interface, according to an implementation.

FIG. 24 illustrates an example system details user interface 2400, according to an implementation. The user interface 2400 displays system details for a selected system 2402. The user interface 2400 can be displayed, for example, in response to selection of a system name in another user interface (e.g., the system overview user interface 2200 described above with respect to FIG. 22). The user interface 2400 displays a system type 2404 (e.g., application server, such as an ABAP system) of the selected system 2402. The user interface 2400 includes an attribute list 2406. The attribute list 2406 can include, for example, values for installed software component, database, change-date, change-user, and other attributes.

Figure 25:
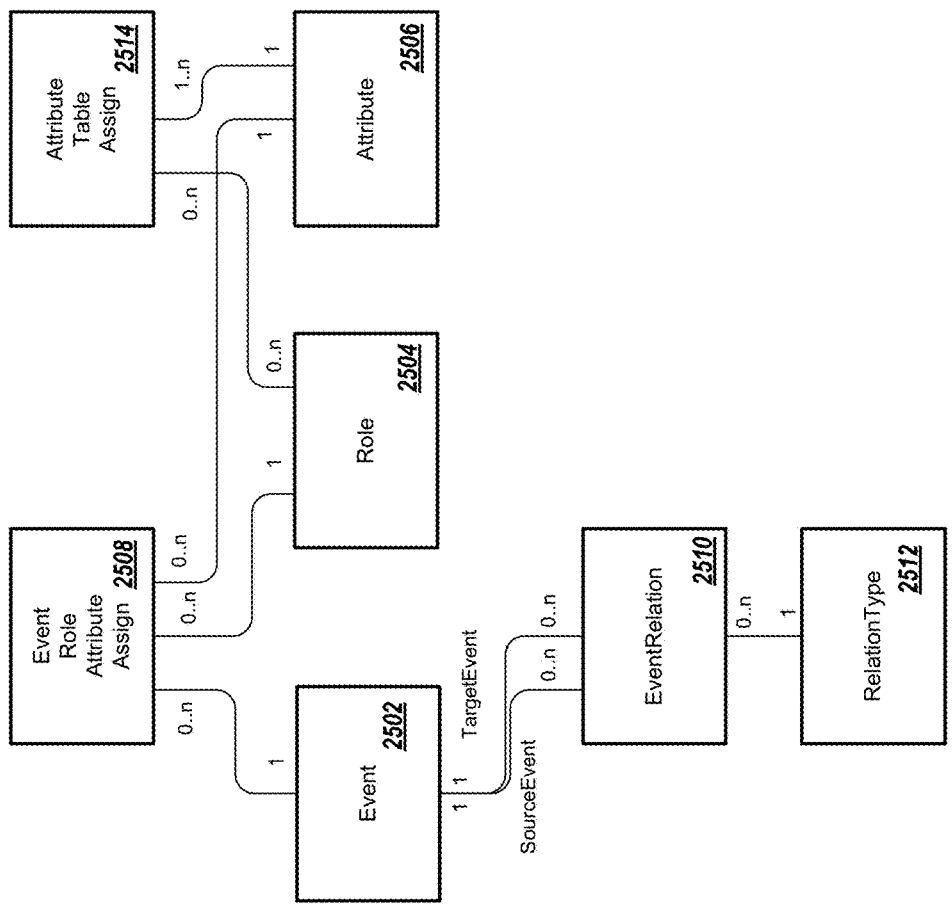
FIG. 25 illustrates an example data model, according to an implementation.

FIG. 25 illustrates an example data model 2500, according to an implementation. The data model 2500 illustrates relationships between data base tables that can be included in the knowledge base 214. For example, the knowledge base 214 can include an Event table 2502, a Role table 2504, and an Attribute table 2506. An Event Role Attribute Assign table 2508 can be used to store information indicating relationships between Event, Role, and Attribute records. A given record in the Event Role Attribute Assign table 2508 can include respective identifiers identifying a record in the Event table 2502, a record in the Role table 2504, and a record in the Attribute table 2506. A given Event, Role, or Attribute record can be associated with zero or more records in the Event Role Attribute Assign table 2508.

An Event Relation table 2510 stores information that links two related events (e.g., a first related event can be a source event and a second related event can be a target event). A Relation Type table 2512 can be used to store information that represents a hierarchy of events. For example, a Logon-Failure event can be defined as a parent event of a Logon-FailureByHTTP event. An Attribute Table Assign table 2514 can be used to store information which indicates which log table field an attribute of a certain role is stored. For example, a record in the Attribute Table Assign table 2514 can indicate that an attribute "user name" for an actor role is stored in a LogHeader log table in a field of "user name".

Figure 26:
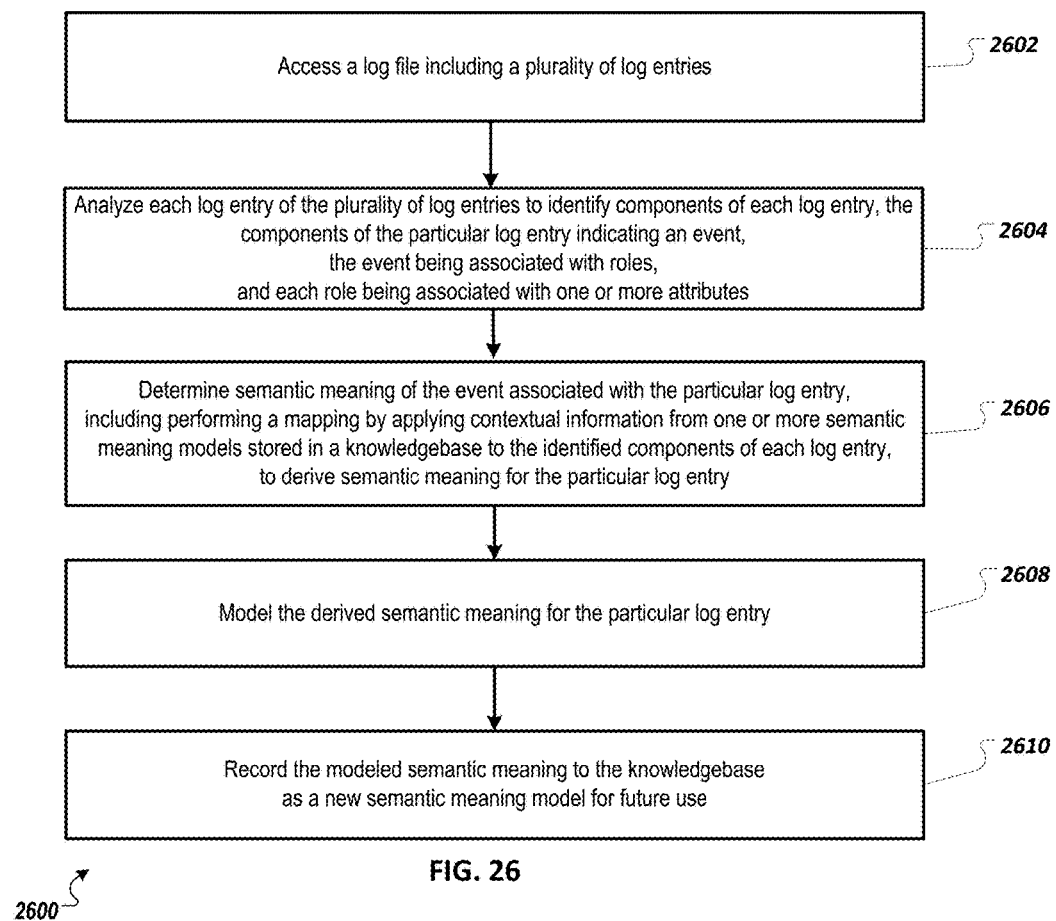
FIG. 26 is a flow chart of an example method for populating a knowledge base, according to an implementation.

FIG. 26 is a flow chart of an example method 2600 for populating a knowledge base, according to an implementation. For clarity of presentation, the description that follows generally describes method 2600 in the context of FIGS. 1-25. However, it will be understood that method 2600 may be performed, for example, by any other suitable system, environment, software, and hardware, or a combination of systems, environments, software, and hardware as appropriate.

At 2602, a log file including a plurality of log entries is accessed. For example, the sample log file 208 can be accessed. From 2602, method 2600 proceeds to 2604.

At 2604, each log entry of the plurality of log entries is analyzed to identify components of each log entry. One or more of the components of the particular log entry can indicate an event. The identified components can be mapped to a log entry model. The event can be associated with one or more roles, and each role can be associated with one or more attributes. Events can be related using event relations of varying event relation types.

In some implementations, a log entry type is assigned to the particular log entry. In some implementations and for some log entry types, assignment of a log entry type is based on text-based components of each log entry and determined using either string comparison or regular expression evaluation. In some implementations and for structured log entries, the log entry type can be determined for the log entry using or more fields of each structured log entry. From 2604, method 2600 proceeds to 2606.

At 2606, semantic meaning of the event associated with the particular log entry is determined. A mapping is performed by applying contextual information from one or more semantic meaning models stored in a knowledgebase to the identified components of each log entry to derive semantic meaning for the particular log entry. From 2606, method 2600 proceeds to 2608.

At 2608, the derived semantic meaning for the particular log entry is modeled. From 2608, method 2600 proceeds to 2610. At 2610, the modeled semantic meaning is recorded in the knowledgebase as a new semantic meaning model for future use. For example, incoming log entries can be analyzed and a determination can be made that an incoming log entry is associated with a semantic event included in the semantic meaning model. Components of the log entry can be mapped to attributes and roles associated with the semantic meaning model.

Figure 27:
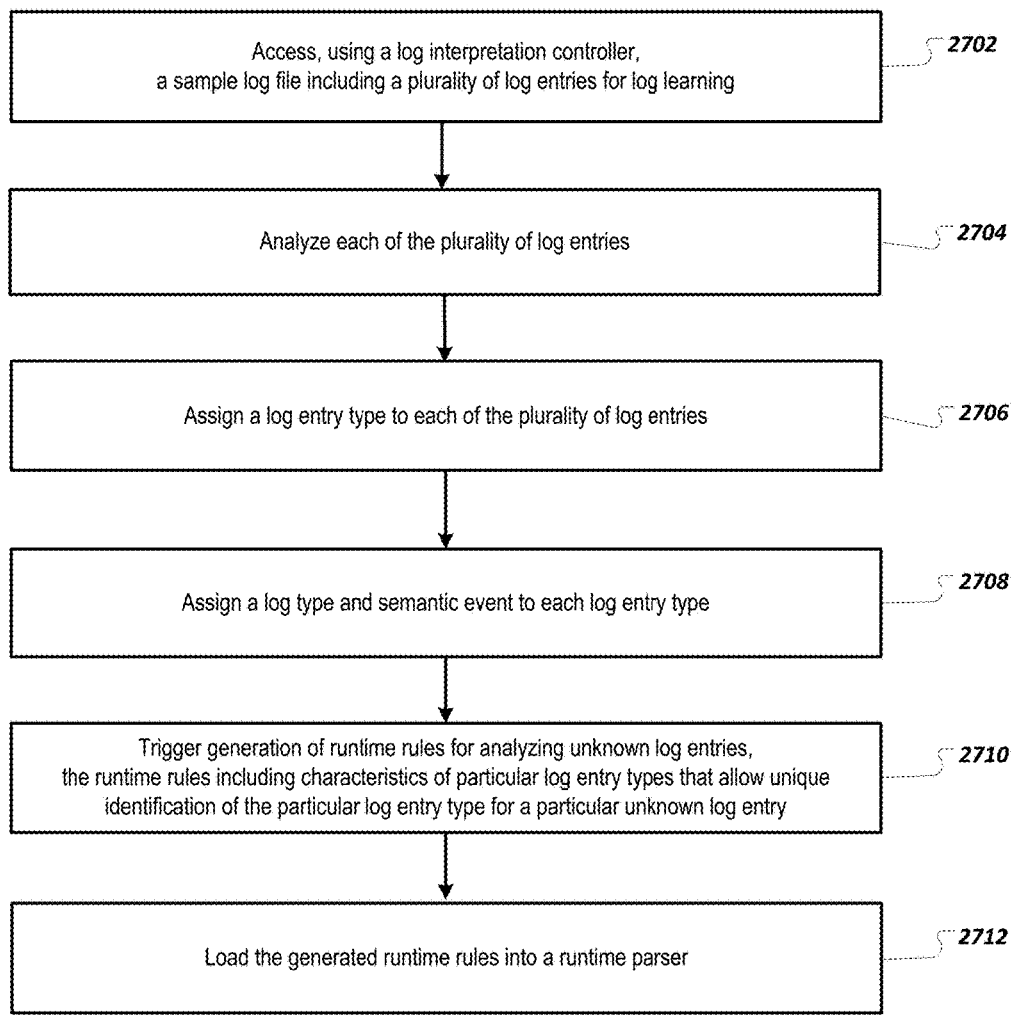
FIG. 27 is a flow chart of an example method for generating runtime rules for a runtime parser, according to an implementation.

FIG. 27 is a flow chart of an example method 2700 for generating runtime rules for a runtime parser, according to an implementation. For clarity of presentation, the description that follows generally describes method 2700 in the context of FIGS. 1-25. However, it will be understood that method 2700 may be performed, for example, by any other suitable system, environment, software, and hardware, or a combination of systems, environments, software, and hardware as appropriate.

The method 2700 can be performed prior to runtime as part of a log learning process. At 2702 a sample log file including a plurality of log entries for log learning is accessed using a log interpretation controller. For example, the sample log file 208 can be accessed. From 2702, method 2700 proceeds to 2704.

At 2704, each of the plurality of log entries is analyzed. From 2704, method 2700 proceeds to 2706. Analyzing can include identifying components of each log entry. Components can include, for example, one or more of internet protocol (IP) address, timestamp, hostname, and media access control (MAC) address.

At 2706, a log entry type is assigned to each of the plurality of log entries. Each log entry type represents a group of one or more log entries with identical internal structure. From 2706, method 2700 proceeds to 2708.

At 2708, a log type and semantic event are assigned to each log entry type. Attributes of a knowledge base can also be assigned to each log entry type. From 2708, method 2700 proceeds to 2710.

At 2710, generation of runtime rules is triggered for analyzing unknown log entries. The runtime rules include characteristics of particular log entry types that allow unique identification of the particular log entry type for a particular unknown log entry. The runtime rules can include regular expressions to extract parts of a particular unknown log entry and to assign the extracted parts to attributes of the knowledge base. From 2710, method 2700 proceeds to 2712.

At 2712, the generated runtime rules are loaded into a runtime parser. The runtime rules can be used by the runtime parser at runtime, as described in more detail below with respect to FIG. 28.

Figure 28:
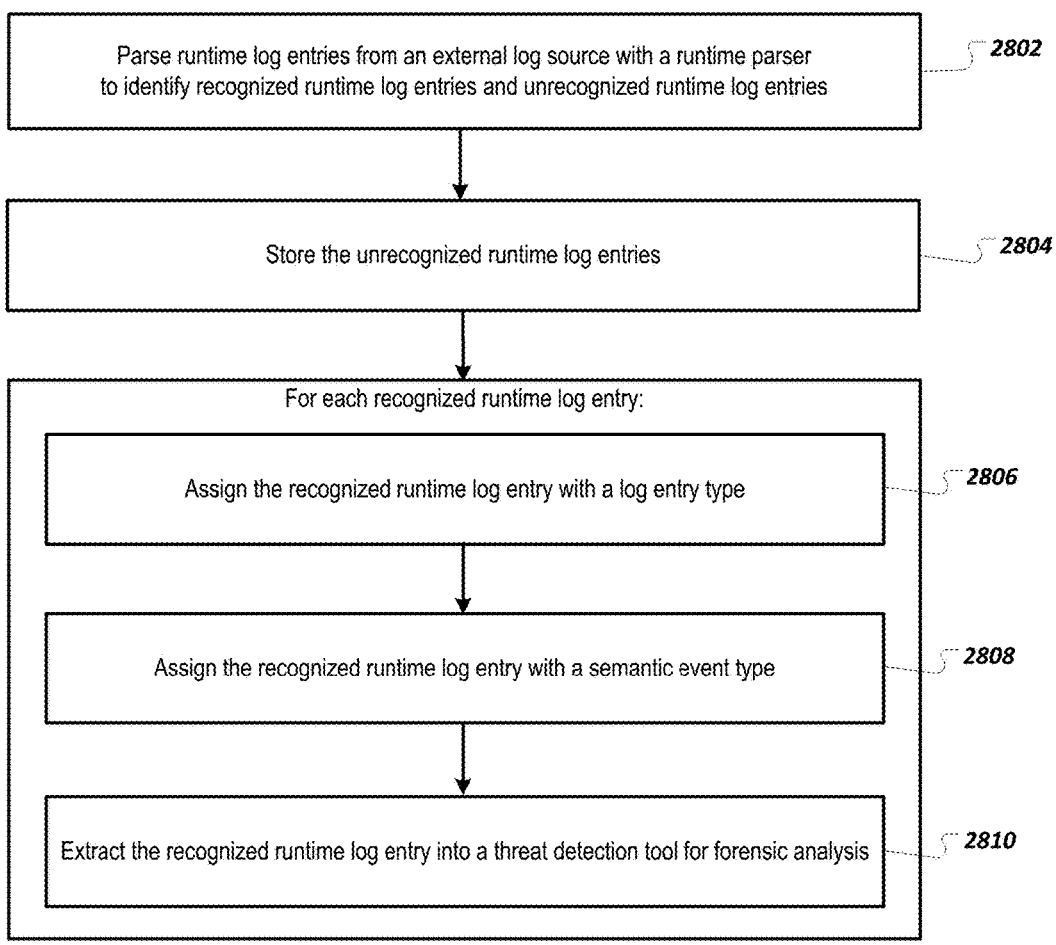
FIG. 28 is a flow chart of an example method for processing a log entry according to runtime rules, according to an implementation.

FIG. 28 is a flow chart of an example method 2800 for processing a log entry according to runtime rules, according to an implementation. For clarity of presentation, the description that follows generally describes method 2800 in the context of FIGS. 1-25. However, it will be understood that method 2800 may be performed, for example, by any other suitable system, environment, software, and hardware, or a combination of systems, environments, software, and hardware as appropriate.

At 2802, runtime log entries are parsed from an external log source with a runtime parser to identify recognized runtime log entries and unrecognized runtime log entries. From 2802, method 2800 proceeds to 2804.

At 2804, unrecognized runtime log entries are stored. In some implementations, the stored unrecognized runtime log entries are reprocessed (e.g., using the method 700) to generate updated runtime rules to correctly recognize the unrecognized runtime log entries. From 2804 method 2800 proceeds to 2806.

At 2806, for each recognized runtime log entry, the runtime log entry is assigned with a log entry type. From 2806, method 2800 proceeds to 2808.

At 2808, for each recognized runtime log entry, the runtime log entry is assigned with a semantic event type. From 2808, method 2800 proceeds to 2810.

At 2810, for each recognized runtime log entry, the runtime log entry is extracted into a threat detection tool for forensic analysis.

Figure 29:
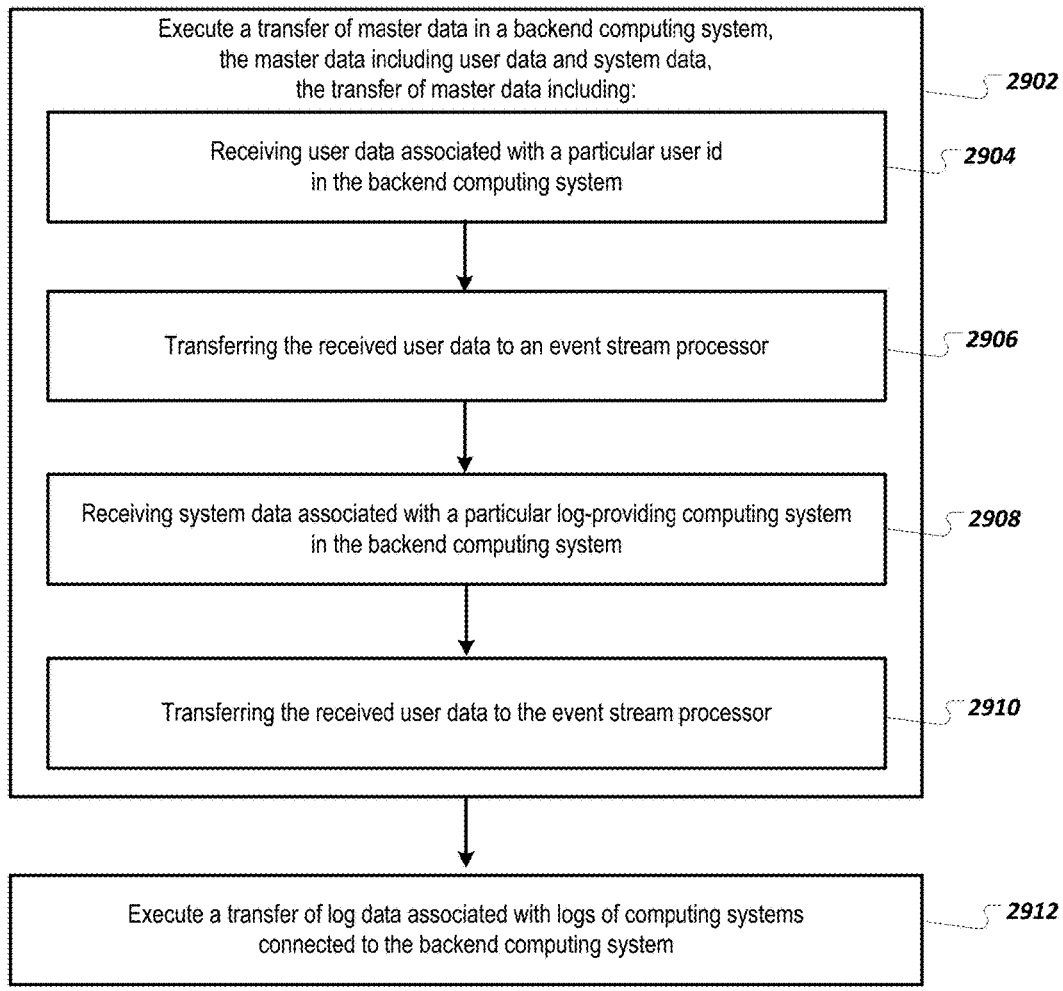
FIG. 29 is a flow chart of an example method for creating and maintaining user and system context and using the user and system context for log analysis, according to an implementation.

FIG. 29 is a flow chart of an example method 2900 for creating and maintaining user and system context and using the user and system context for log analysis, according to an implementation. For clarity of presentation, the description that follows generally describes method 2900 in the context of FIGS. 1-25. However, it will be understood that method 2900 may be performed, for example, by any other suitable system, environment, software, and hardware, or a combination of systems, environments, software, and hardware as appropriate.

At 2902, a transfer of master data is executed in a backend computing system. The master data includes user data and system data. For the user data, the master data can be received from a user management system or an identity management system. The user data can be associated with a single individual or a common identification associated with multiple individuals. For system data, the master data can be received from system context data associated with a particular computing system connected to the backend computing system as determined by a software application executing on the backend computing system or manual maintenance data related to a particular system context. The transfer of master data can include multiple, steps, as described with respect to steps 2904-2910 below.

At 2904, user data associated with a particular user id in the backend computing system is received. From 2904, method 2900 proceeds to 2906. At 2906, the received user data is transferred to an event stream processor. If a determination is made that a user context associated with the particular user id is not available to the ESP, a new user context associated with the particular user is created. If a determination is made that a user context associated with the particular user is available to the ESP, the user context associated with the particular user can be updated. From 2906, method 2900 proceeds to 2908.

At 2908, system data associated with a particular log providing computing system is received in the backend computing system. From 2908, method 2900 proceeds to 2910. At 2910, the received user data is transferred to the event stream processor. If a determination is made that a system context associated with the particular log providing computing system is not available to the ESP, a new system context associated with the particular log providing computing system is created. If a determination is made that a system context associated with the particular log providing computing system is available to the ESP, the system context associated with the particular log providing computing system is updated. From 2910, method 2900 proceeds to 2912.

At 2912, a transfer of log data associated with logs of computing systems connected to the backend computing system is executed. The transfer of log data can include: reading log data from a particular log associated with a particular computing system, wherein the log data is read starting with the latest timestamp; transferring read log data to the ESP, wherein the read log data is transformed into a normalized format prior to transfer; and enriching each log entry of the transferred log data.

The enrichment of each particular log entry can include: attempting to read a user context for a particular user id associated with the particular log entry; if a user context for the particular user id is found within the backend computing system, writing into the particular log a user context id associated with the user context; if a user context for the particular user id is not found within the backend computing system, creating a new user context within the backend computing system and writing into the particular log a user context id associated with the new user context; removing the original user id from the particular log entry; and writing a revised log entry into the backend computing system.

Figure 30:
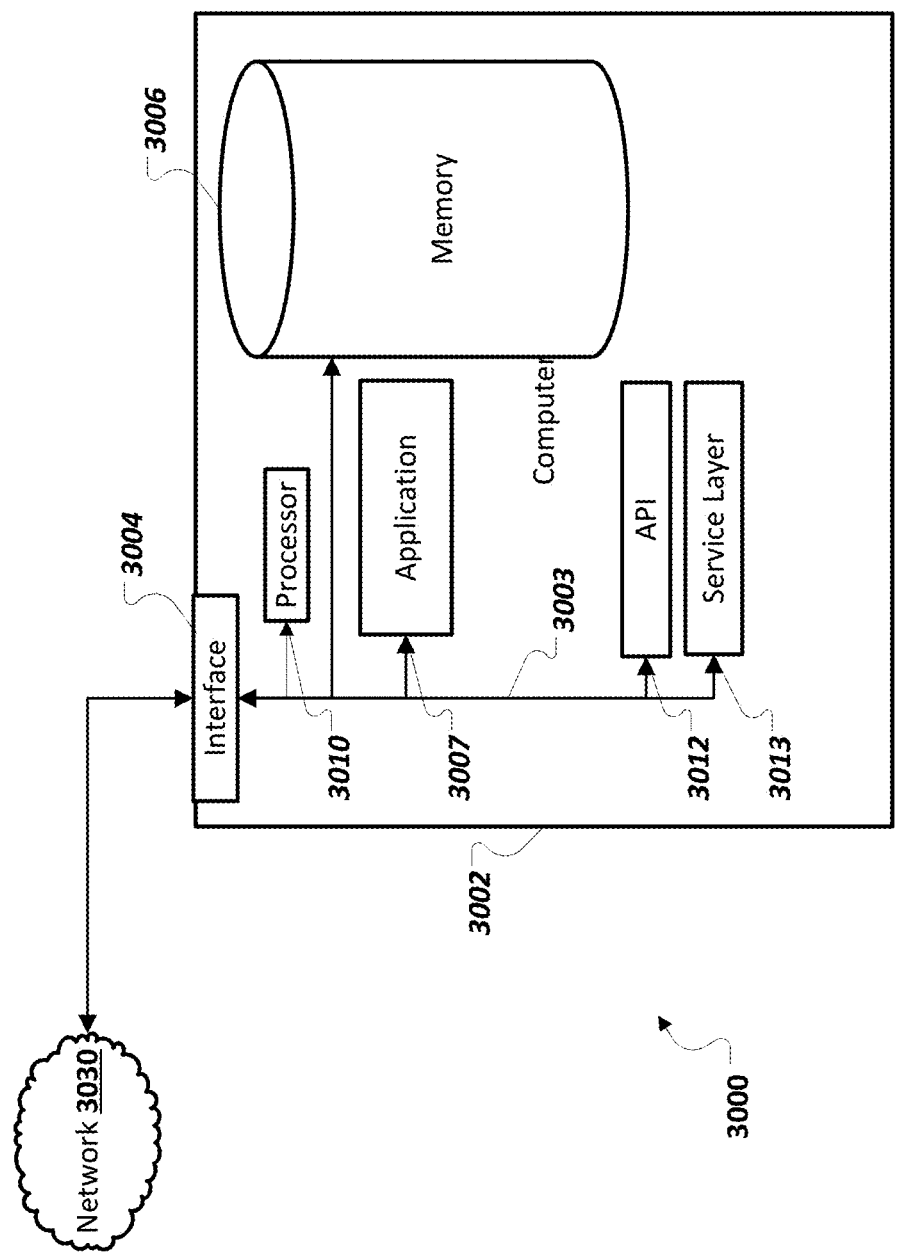
FIG. 30 is a block diagram of an exemplary computer used in the EDCS, according to an implementation.

FIG. 30 is a block diagram 3000 of an exemplary computer 3002 used in any of the EDCS's or other systems described in this specification, according to an implementation. The illustrated computer 3002 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 3002 may comprise a computer that includes an input device, such as a keypad, keyboard, touch screen, or other device that can accept user information, and an output device that conveys information associated with the operation of the computer 3002, including digital data, visual and/or audio information, or a GUI.

The computer 3002 can process for/serve as a client, a server, and/or any other component of the EDCS (whether or not illustrated). The illustrated computer 3002 is communicably coupled with a network 3030 (e.g., network 140 of FIGS. 1 and 2). In some implementations, one or more components of the computer 3002 may be configured to operate within a cloud-computing-based environment.

At a high level, the computer 3002 is an electronic computing device operable to receive, transmit, process, store, or manage data and information associated with the EDCS. According to some implementations, the computer 3002 may also include or be communicably coupled with a cloud-computing server, application server, e-mail server, web server, caching server, streaming data server, business intelligence (BI) server, and/or other server.

The computer 3002 can generate requests to transmit over network 3030 (e.g., as a client device) or receive requests over network 3030 from a client application (e.g., a web browser or other application) and responding to the received requests by processing the said requests in an appropriate software application, hardware, etc. In addition, requests may also be sent to the computer 3002 from internal users (e.g., from a command console or by other appropriate access method), external or third-parties, other automated applications, as well as any other appropriate entities, individuals, systems, or computers.

Each of the components of the computer 3002 can communicate using a system bus 3003. In some implementations, any and/or all the components of the computer 3002, both hardware and/or software, may interface with each other and/or the interface 3004 over the system bus 3003 using an API 3012 and/or a service layer 3013. The API 3012 may include specifications for routines, data structures, and object classes. The API 3012 may be either computer-language independent or dependent and refer to a complete interface, a single function, or even a set of APIs. The service layer 3013 provides software services to the computer 3002 and/or the EDCS. The functionality of the computer 3002 may be accessible for all service consumers using this service layer. Software services, such as those provided by the service layer 3013, provide reusable, defined business functionalities through a defined interface. For example, the interface may be software written in JAVA, C++, ABAP, or other suitable language providing data in extensible markup language (XML) format or other suitable format. While illustrated as an integrated component of the computer 3002, alternative implementations may illustrate the API 3012 and/or the service layer 3013 as stand-alone components in relation to other components of the computer 3002 and/or the EDCS. Moreover, any or all parts of the API 3012 and/or the service layer 3013 may be implemented as child or sub-modules of another software module, enterprise application, or hardware module without departing from the scope of this disclosure.

The computer 3002 includes an interface 3004. Although illustrated as a single interface 3004 in FIG. 30, two or more interfaces 3004 may be used according to particular needs, desires, or particular implementations of the computer 3002 and/or the EDCS. The interface 3004 is used by the computer 3002 for communicating with other systems in a distributed environment—including within the EDCS—connected to the network 3030 (whether illustrated or not). Generally, the interface 3004 comprises logic encoded in software and/or hardware in a suitable combination and operable to communicate with the network 3030. More specifically, the interface 3004 may comprise software supporting one or more communication protocols associated with communications such that the network 3030 or interface's hardware is operable to communicate physical signals within and outside of the illustrated EDCS.

The computer 3002 includes a processor 3005. Although illustrated as a single processor 3005 in FIG. 30, two or more processors may be used according to particular needs, desires, or particular implementations of the computer 3002 and/or the EDCS. Generally, the processor 3005 executes instructions and manipulates data to perform the operations of the computer 3002. Specifically, the processor 3005 executes the functionality required for populating a knowledge base, generating runtime rules for a runtime parser, processing a log entry according to the runtime rules, and creating and maintaining user and system context and using the user and system context for log analysis.

The computer 3002 also includes a database 3006 and memory 3008 that hold data for the computer 3002 and/or other components of the EDCS. Although illustrated as a single database 3006 and memory 3008 in FIG. 30, two or more databases 3008 and memories 3008 may be used according to particular needs, desires, or particular implementations of the computer 3002 and/or the EDCS. While database 3008 and memory 3008 are illustrated as integral components of the computer 3002, in alternative implementations, the database 3006 and memory 3008 can be external to the computer 3002 and/or the EDCS. In some implementations, the database can be a conventional database or an in-memory database, or a mix of both. In some implementations, the database 3006 and memory 3008 can be combined into one component.

The application 3007 is an algorithmic software engine providing functionality according to particular needs, desires, or particular implementations of the computer 3002 and/or the EDCS, particularly with respect to functionalities required for populating a knowledge base, generating runtime rules for a runtime parser, processing a log entry according to the runtime rules, and creating and maintaining user and system context and using the user and system context for log analysis. For example, application 3007 can serve as the event stream processor 110, the discovery parser 210, the runtime parser 220, or any other component of the EDCS (whether or not illustrated). Further, although illustrated as a single application 3007, the application 3007 may be implemented as multiple applications 3007 on the computer 3002. In addition, although illustrated as integral to the computer 3002, in alternative implementations, the application 3007 can be external to the computer 3002 and/or the EDCS.

There may be any number of computers 3002 associated with, or external to, the EDCS and communicating over network 3030. Further, the term "client," "user," and other appropriate terminology may be used interchangeably as appropriate without departing from the scope of this disclosure. Moreover, this disclosure contemplates that many users may use one computer 3002, or that one user may use multiple computers 3002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    executing, by a computer, a transfer of master data in a backend computing system, wherein the master data includes user data and system data, and wherein the transfer of master data comprises:
        receiving, by a computer, user data associated with a particular user id in the backend computing system;
        transferring, by a computer, the received user data to an event stream processor (ESP), wherein a user context associated with the particular user id is created or updated;
        receiving, by a computer, system data associated with a particular log providing computing system in the backend computing system;
        transferring, by a computer, the received system data to the ESP, wherein a system context associated with the particular log providing system is created or updated; and
        executing, by a computer, a transfer of log data associated with logs of computing systems connected to the backend computing system;
    enriching one or more log entries of the transferred log data based on the user context and the system context; and
    rendering a semantic graphical user interface for interaction with the transferred log data, wherein the semantic graphical user interface is configured to render distributions of selectable semantic attribute type values with respect to events in the transferred log data and selected semantic filter values; wherein alert indications of malicious computing activities are identified in the semantic graphical user interface according to analysis with respect to one or more alert patterns defined using semantic events, and wherein one or more alerts are generated and transmitted based on the analysis.

2. The method of claim 1, wherein, for the user data, the master data is received from a user management system or an identity management system, and wherein, for the system data, the master data is received from system context data associated with a particular computing system connected to the backend computing system as determined by a software application executing on the backend computing system or manual maintenance data related to a particular system context.

3. The method of claim 1, wherein the user data is associated with a single individual or a common identification associated with multiple individuals.

4. The method of claim 1, comprising:
    if determined that the user context associated with the particular user id is not available to the ESP, creating a new user context associated with the particular user id; and
    if determined that the user context associated with the particular user id is available to the ESP, updating the user context associated with the particular user id.

5. The method of claim 1, comprising:
- if determined that the system context associated with the particular log providing computing system is not available to the ESP, creating a new system context associated with the particular log providing computing system; and
- if determined that the system context associated with the particular log providing computing system is available to the ESP, updating the system context associated with the particular log providing computing system.

6. The method of claim 1, wherein the transfer of log data comprises:
- reading log data from a particular log associated with a particular computing system, wherein the log data is read starting with the latest timestamp; and
- transferring read log data to the ESP, wherein the read log data is transformed into a normalized format prior to transfer.

7. The method of claim 6, wherein the enrichment of each particular log entry comprises:
- attempting to read a user context for a particular user id associated with the particular log entry;
- if a user context for the particular user id is found within the backend computing system, writing into the particular log a user context id associated with the user context;
- if a user context for the particular user id is not found within the backend computing system, creating a new user context within the backend computing system and writing into the particular log a user context id associated with the new user context;
- removing the original user id from the particular log entry; and
- writing a revised log entry into the backend computing system.

8. A non-transitory, computer-readable medium storing computer-readable instructions, the instructions executable by a computer and configured to:
- execute a transfer of master data in a backend computing system, wherein the master data includes user data and system data, and wherein the transfer of master data comprises:
  - receive user data associated with a particular user id in the backend computing system;
  - transfer the received user data to an event stream processor (ESP), wherein a user context associated with the particular user id is created or updated;
  - receive system data associated with a particular log providing computing system in the backend computing system;
  - transfer the received system data to the ESP, wherein a system context associated with the particular log providing system is created or updated; and
- execute a transfer of log data associated with logs of computing systems connected to the backend computing system;
- enrich one or more log entries of the transferred log data based on the user context and the system context; and
- render a semantic graphical user interface for interaction with the transferred log data, wherein the semantic graphical user interface is configured to render distributions of selectable semantic attribute type values with respect to events in the transferred log data and selected semantic filter values; wherein alert indications of malicious computing activities are identified in the semantic graphical user interface according to analysis with respect to one or more alert patterns defined using semantic events, and wherein one or more alerts are generated and transmitted based on the analysis.

9. The non-transitory, computer-readable medium of claim 8, wherein, for the user data, the master data is received from a user management system or an identity management system, and wherein, for the system data, the master data is received from system context data associated with a particular computing system connected to the backend computing system as determined by a software application executing on the backend computing system or manual maintenance data related to a particular system context.

10. The non-transitory, computer-readable medium of claim 8, wherein the user data is associated with a single individual or a common identification associated with multiple individuals.

11. The non-transitory, computer-readable medium of claim 8, the instructions further configured to:
- if determined that the user context associated with the particular user id is not available to the ESP, create a new user context associated with the particular user id; and
- if determined that the user context associated with the particular user id is available to the ESP, update the user context associated with the particular user id.

12. The non-transitory, computer-readable medium of claim 8, the instructions further configured to:
- if determined that the system context associated with the particular log providing computing system is not available to the ESP, create a new system context associated with the particular log providing computing system; and
- if determined that the system context associated with the particular log providing computing system is available to the ESP, update the system context associated with the particular log providing computing system.

13. The non-transitory, computer-readable medium of claim 8, wherein the transfer of log data comprises:
- reading log data from a particular log associated with a particular computing system, wherein the log data is read starting with the latest timestamp; and
- transferring read log data to the ESP, wherein the read log data is transformed into a normalized format prior to transfer.

14. The non-transitory, computer-readable medium of claim 13, wherein the enrichment of each particular log entry comprises:
- attempting to read a user context for a particular user id associated with the particular log entry;
- if a user context for the particular user id is found within the backend computing system, writing into the particular log a user context id associated with the user context;
- if a user context for the particular user id is not found within the backend computing system, creating a new user context within the backend computing system and writing into the particular log a user context id associated with the new user context;
- removing the original user id from the particular log entry; and
- writing a revised log entry into the backend computing system.

15. A system, comprising:
- a memory;
- at least one hardware processor interoperably coupled with the memory and configured to:

execute a transfer of master data in a backend computing system, wherein the master data includes user data and system data, and wherein the transfer of master data comprises:
receive user data associated with a particular user id in the backend computing system;
transfer the received user data to an event stream processor (ESP), wherein a user context associated with the particular user id is created or updated;
receive system data associated with a particular log providing computing system in the backend computing system;
transfer the received system data to the ESP, wherein a system context associated with the particular log providing system is created or updated; and
execute a transfer of log data associated with logs of computing systems connected to the backend computing system;
enrich one or more log entries of the transferred log data based on the user context and the system context; and
render a semantic graphical user interface for interaction with the transferred log data, wherein the semantic graphical user interface is configured to render distributions of selectable semantic attribute type values with respect to events in the transferred log data and selected semantic filter values; wherein alert indications of malicious computing activities are identified in the semantic graphical user interface according to analysis with respect to one or more alert patterns defined using semantic events, and wherein one or more alerts are generated and transmitted based on the analysis.

16. The system of claim 15, wherein, for the user data, the master data is received from a user management system or an identity management system, and wherein, for the system data, the master data is received from system context data associated with a particular computing system connected to the backend computing system as determined by a software application executing on the backend computing system or manual maintenance data related to a particular system context.

17. The system of claim 15, wherein the user data is associated with a single individual or a common identification associated with multiple individuals.

18. The system of claim 15, the processor further configured to:
if determined that the user context associated with the particular user id is not available to the ESP, create a new user context associated with the particular user id; and
if determined that the user context associated with the particular user id is available to the ESP, update the user context associated with the particular user id.

19. The system of claim 15, the processor further configured to:
if determined that the system context associated with the particular log providing computing system is not available to the ESP, create a new system context associated with the particular log providing computing system; and
if determined that the system context associated with the particular log providing computing system is available to the ESP, update the system context associated with the particular log providing computing system.

20. The system of claim 15, wherein the transfer of log data comprises:
reading log data from a particular log associated with a particular computing system, wherein the log data is read starting with the latest timestamp; and
transferring read log data to the ESP, wherein the read log data is transformed into a normalized format prior to transfer.

* * * * *